United States Patent
Cole et al.

(10) Patent No.: US 10,692,234 B2
(45) Date of Patent: Jun. 23, 2020

(54) METHODS AND APPARATUS FOR MAKING ENVIRONMENTAL MEASUREMENTS AND/OR USING SUCH MEASUREMENTS

(71) Applicant: NextVR Inc., Newport Beach, CA (US)

(72) Inventors: David Cole, Laguna Beach, CA (US); Alan McKay Moss, Laguna Beach, CA (US)

(73) Assignee: NextVR Inc., Newport Beach, CA (US)

(*) Notice: Subject to any disclaimer, the term of this patent is extended or adjusted under 35 U.S.C. 154(b) by 74 days.

(21) Appl. No.: 15/043,356

(22) Filed: Feb. 12, 2016

(65) Prior Publication Data

US 2016/0239978 A1    Aug. 18, 2016

Related U.S. Application Data

(60) Provisional application No. 62/115,605, filed on Feb. 12, 2015.

(51) Int. Cl.
*G06T 7/00* (2017.01)
*G06T 7/557* (2017.01)
(Continued)

(52) U.S. Cl.
CPC .............. *G06T 7/557* (2017.01); *G06T 7/593* (2017.01); *G01S 17/89* (2013.01);
(Continued)

(58) Field of Classification Search
CPC ...... G06T 7/593; G06T 7/0075; H04N 13/271
See application file for complete search history.

(56) References Cited

U.S. PATENT DOCUMENTS 9,042,636 B2 * 5/2015 Turner ................. H04N 13/026
                                                    382/103
9,123,117 B2 * 9/2015 Ciurea .................... G06T 7/593
(Continued)

FOREIGN PATENT DOCUMENTS

CN      101771892 A      7/2010
CN      102681661 A      9/2012
(Continued)

OTHER PUBLICATIONS

Rendering Layered Depth Images; by Gortler; et al. Microsoft Research, Mar. 19, 1997.*
(Continued)

*Primary Examiner* — Luis Perez-Fuentes
(74) *Attorney, Agent, or Firm* — Straub & Straub; Michael P. Straub; Stephen T. Straub

(57) ABSTRACT

Methods and apparatus for making environmental measurements are described. In some embodiments different devices are used to capture environmental information at different times, rates and/or resolutions. Environmental information, e.g., depth information, from multiples sources captured using a variety of devices is processed and combined. Some environmental information is captured during an event. Such information is combined, in some embodiments, with environmental information that was captured prior to the event. Environmental depth model is generated in some embodiments by combining, e.g., reconciling, depth information from at least two different sources including: i) depth information obtained from a static map, ii) depth information obtained from images captured by light field cameras, and iii) depth information obtained from images captured by stereoscopic camera pairs. The reconciliation process may involve a variety of information weighting operations taking
(Continued)

into consideration the advantages of different depth information sources and the availability of such information.

23 Claims, 15 Drawing Sheets

(51) Int. Cl.
G06T 7/593 (2017.01)
H04N 13/204 (2018.01)
G01S 17/89 (2020.01)
H04N 13/00 (2018.01)
H04N 13/128 (2018.01)
H04N 13/246 (2018.01)

(52) U.S. Cl.
CPC .............. G06T 2207/10012 (2013.01); G06T 2207/10052 (2013.01); H04N 13/128 (2018.05); H04N 13/204 (2018.05); H04N 13/246 (2018.05); H04N 2013/0081 (2013.01)

(56) References Cited

U.S. PATENT DOCUMENTS

| | | | | |
|---|---|---|---|---|
| 9,300,940 | B2* | 3/2016 | Zhang | H04N 13/0022 |
| 9,325,968 | B2* | 4/2016 | Baldwin | H04N 13/0011 |
| 9,369,689 | B1* | 6/2016 | Tran | G06T 7/593 |
| 9,451,232 | B2* | 9/2016 | Ward | H04N 13/0011 |
| 9,538,160 | B1* | 1/2017 | Cole | H04N 13/0239 |
| 9,747,694 | B2* | 8/2017 | Chung | G06T 7/593 |
| 9,786,097 | B2* | 10/2017 | Bell | G06T 19/003 |
| 9,872,010 | B2* | 1/2018 | Tran | G06T 7/593 |
| 10,003,787 | B1* | 6/2018 | Wan | G06T 7/12 |
| 2004/0105573 | A1 | 6/2004 | Neuman et al. | |
| 2012/0050485 | A1* | 3/2012 | Thorpe | H04N 13/004 348/46 |
| 2012/0176481 | A1 | 7/2012 | Lukk et al. | |
| 2013/0004060 | A1* | 1/2013 | Bell | G01S 17/89 382/154 |
| 2013/0033586 | A1* | 2/2013 | Hulyalkar | H04N 13/106 348/51 |
| 2014/0232820 | A1* | 8/2014 | Ha | G06T 3/40 348/43 |
| 2014/0327736 | A1* | 11/2014 | DeJohn | H04N 13/0022 348/43 |
| 2014/0368615 | A1 | 12/2014 | van Baar et al. | |
| 2015/0002636 | A1* | 1/2015 | Brown | H04N 13/254 348/47 |
| 2015/0269785 | A1* | 9/2015 | Bell | G06T 19/003 345/427 |
| 2016/0217225 | A1* | 7/2016 | Bell | G06F 17/5004 |
| 2018/0143756 | A1* | 5/2018 | Mildrew | G06F 3/011 |
| 2018/0144535 | A1* | 5/2018 | Ford | G06T 15/005 |

FOREIGN PATENT DOCUMENTS

| | | |
|---|---|---|
| EP | 2378488 | 10/2011 |
| WO | 2014062663 A1 | 4/2014 |
| WO | 2014068472 A1 | 5/2014 |

OTHER PUBLICATIONS

Google Search for NPL; 2019 (Year: 2019).*
Light field assisted stereo matching using depth from focus; Kowalezuk; 2012. (Year: 2012).*
Light detector and ranging; Portland State University; 2008 (Year: 2008).*
Notification of Transmittal of the International Search Report and the Written Opinion of the International Searching Authority, International Search Report and Written Opinion of the International Searching Authority from PCT/US2016/017874 dated Jun. 30, 2016 1-9 pages.
Zhan, DynamicDepth of Field on Live Video Streams: A Stereo Solution. Computer Graphic international , 2011, pp. 1-9, [online]. Retrieved from the Internet: <URL:http://www.eecis.edu/-zyu/CGI2011/>.
Crowley J L et al: "Principles and techniques for sensor data fusion", Signal Processing, Elsevier Science Publishers B.V. Amsterdam, NL, vol. 32, No. 1-2, May 1993 (May 1, 1993), pp. 5-27, XP026650218, ISSN: 0165-1684, [retrieved on May 1, 1993], DOI: 10.1016/0165-1684(93)90034-8.
Harashima H et al: "Real-time video-based modeling and rendering of 3D scenes", IEEE Computer Graphic and Applications, IEEE Service Center, New York, NY, US, vol. 22, No. 2, Mar. 2002 (Mar. 1, 2002), pp. 66-73, XP011094242, ISSN: 0272-1716, DOI: 10.1109/38.988748.
Jedrzej Kowalczuk et al: "Light Field Assisted Stereo Matching using Depth from Focus and Image-Guided Cost-Volume Filtering", Proceedings of The 2012 International Conference on Image Processing, Computer Vision, and Pattern Recognition, IPCV 2012, Jul. 16, 2012 (Jul. 16, 2012), pp. 1114-1119, XP055214219.
Yu Zhan et al: "Racking focus and tracking focus on live video streams: a stereo solution", Visual Computer, Springer, Berlin, DE, vol. 30, No. 1, Feb. 15, 2013 (Feb. 15, 2013), pp. 45-58, XP035366302, ISSN: 0178-2789, [retrieved on Feb. 15, 2013], DOI: 10.1007/S00371-013-0778-4.
Extended European Search Report of the European Patent Office from corresponding European Patent Application No. 16750020.6 includes, the supplementary European search report , the European search opinion, and cover sheet, pp. 1-10, dated Aug. 29, 2018.

* cited by examiner

METHODS AND APPARATUS FOR MAKING ENVIRONMENTAL MEASUREMENTS AND/OR USING SUCH MEASUREMENTS

RELATED APPLICATIONS

The present application claims the benefit of U.S. Provisional Patent Application Ser. No. 62/115,605 filed Feb. 12, 2015 which is hereby expressly incorporated by reference in its entirety.

FIELD

The present invention relates to methods and apparatus for capturing and using environmental information, e.g., measurements and images, to support various applications including the generation and/or display of stereoscopic images which can be used as part of a 3D experience.

BACKGROUND

Accurate representation of a 3D environment often requires reliable models of the environment. Such models, when available, can be used to during image playback so that object captured in images of a scene appear to the viewer to be the correct size. Environmental maps can also be used in stitching together different pieces of an image and to facilitate alignment of images captured by different cameras.

While environment maps, when available, can facilitate a much more realistic viewing experience than when a simple spherical model of an environment is assumed, there are numerous difficulties associated with obtaining accurate environmental information during an event which may be filmed for later playback. For example, while LIDAR measurement technique may be used to make environmental measurement of distances relative to a camera position prior to deployment of one or more camera, e.g., stereoscopic cameras or other cameras, to capture an event, the laser(s) used for LIDAR measurements may be a distraction or unsuitable for use during an actual event while people trying to view a concert, game or other activity. In addition, the placement of the camera rig used to capture an event may preclude a LIDAR device being placed at the same location during the event.

Thus it should be appreciated that while LIDAR may be used to make accurate measurements of a stadium or other event location prior to an event, because of the use of LASER light as well as the time associated with making LIDAR measurements of an area, LIDAR is not well suited for making measurements of an environment from the location of a camera position during an event which is to be captured by one or more cameras placed and operated from the camera position during an ongoing event.

While LIDAR can be used to make highly accurate distance measurements, for the above discussed reasons it is normally used when a stadium or other event area does not have an ongoing event, e.g., used prior to actual event. As a result, the LIDAR distance measurement normally measure an empty stadium or event area without people present. In addition, since the LIDAR measurements are normally made before any modification or display set ups for a particular event, the static environmental map provided by a LIDAR or other measurement system, while in many cases highly accurate with regard to the environment at the time of measurement, often does not accurately reflect the state and shape of an environment during an event such as a sports game, concert or fashion show.

In view of the above discussion it should be appreciated that there is a need for new and improved methods of making environmental measurement and, in particular, measuring the shape of an environment during an event. While not necessary for all embodiments, it would be desirable if an environment could be accurately measured during an event with regard to a camera position from which stereoscopic images are captured for later playback as part of simulating the 3D environment of the event.

SUMMARY

Methods and apparatus for making environmental measurements are described. Environmental information captured using a variety of devices is processed and combined. In some embodiments different devices are used to capture environmental information at different times, rates and/or resolutions. At least some of the environmental information used to map the environment is captured during an event. Such information is combined, in some but not necessarily all embodiments, with environmental information that was captured prior to the event. However, depending on the embodiment, a single environmental measurement technique may be used but in many embodiments multiple environmental measurement techniques are used with the environmental information, e.g., depth information relative to a camera position, being combined to generate a more reliable and timely environmental map than might be possible if a single source of environmental information were used to generate a depth map.

In various embodiments environmental information is obtained from one or more sources. In some embodiments, a static environmental map or model, such as one produced from LIDAR measurements before an event is used. LIDAR is a detection system that works on the principle of radar, but uses light from a laser for distance measurement. From LIDAR measurements made from a location to be used for a camera position where a camera is placed for capturing images during the actual event, or from model of the environment made based on another location but with information about the location of the camera position known, a static map of an environment relative to a camera position is generated. The static map provides accurate distance information for the environment in many cases, assuming the environment is unoccupied or has not otherwise changed from the time the measurements used to make the static map were made. Since the static map normally corresponds to an empty environment, the distances indicated in a static depth map are often maximum distances since objects such as persons, signs, props, etc, are often added to an environment for an event and it is rare that a structure shown in the static map is removed for an event. Thus, static map can and sometimes is used to provide maximum distance information and to provide information on the overall scale/size of the environment.

In addition to static model information, in some embodiments environmental measurements are made using information captured during an event. The capture of the environmental information during the event involves, in some embodiments, the use of one or more light field cameras which capture images from which depth information can be obtained using known techniques. In some embodiments, light field cameras which provide both images and depth maps generated from the images captured by the light field camera are used. The cameras maybe, and in some embodiments are, mounted on or incorporated into a camera rig which also includes one or more pairs of stereoscopic cameras. Methods for generating depth information from light field cameras are known and used in some embodiments. For example, image data corresponding to an area or a point captured by sensor portions corresponding to different lenses of the light field micro array can be processed to provide information on the distance to the point or area.

The light field camera has the advantage of being able to passively collect images during an event which can be used to provide distance information. A drawback of the use of a light field camera is that it normally has lower resolution than that of a regular camera due to the use of the lens array over the sensor which effectively lowers the resolution of the individual captured images.

In addition to the images of the light field camera or cameras, the images captured by other cameras including, e.g., stereoscopic camera pairs can be processed and used to provide depth information. This is possible since the cameras of a stereoscopic pair are spaced apart by a known distance and this information along with the captured images can, and in some embodiments is used to determine the distance from the camera to a point in the environment captured by the cameras in the stereoscopic camera pair. The depth information, in terms of the number of environmental points or locations for which depth can be estimated, maybe as high or almost as high as the number of pixels of the image captured by the individual cameras of the stereoscopic pairs since the camera do not use a micro lens array over the sensor of the camera.

While the output of the stereoscopic cameras can, and in some embodiments are, processed to generate depth information, it may be less reliable in many cases than the depth information obtained from the output of the light field cameras.

In some embodiments, the static model of the environment provides maximum distance information, the depth information from the light field cameras provides more up to date depth information which normally indicates depths which are equal to or less than the depths indicated by the static model but which are more timely and which may vary during an event as environmental conditions change. Similarly the depth information from the images captured by the stereo camera pair or pairs tends to be timely and available form images captured during an event.

In various embodiments the depth information from the different sources, e.g., static model which may be based on LIDAR measurements prior to an event, depth information from the one or more light field cameras and depth information generated from the stereoscopic images are combined, e.g., reconciled. The reconciliation process may involve a variety of techniques or information weighting operations taking into consideration the advantages of different depth information sources and the availability of such information.

For example, in one exemplary resolution process LIDAR based depth information obtained from measurements of the environment prior to an event is used to determine maximum depths, e.g., distances, from a camera position and are used in the absence of additional depth information to model the environment.

When depth information is available from a light field camera or array of light field cameras, the depth information is used to refine the environmental depth map so that it can reflect changes in the environment during an ongoing event. In some embodiments reconciling depth map information obtained from images captured by a light field camera includes refining the LIDAR based depth map to include shorter depths reflecting the presence of objects in the environment during an event. In some cases reconciling an environmental depth map that is based on light field depth measurements alone, or in combination with information from a static or LIDAR depth map, includes using depth information to further clarify the change in depths between points where the depth information is known from the output of the light field camera. In this way, the greater number of points of information available from the light field and/or stereoscopic images can be used to refine the depth map based on the output of the light field camera or camera array.

Based on a depth map, a 3D model of the environment can be generated. The model may be in the form of a grid map of the environment onto which captured images can be applied. The application of images to such a map is sometimes called wrapping since the application has the effect of applying the image as if it was being wrapped unto the environmental model.

By using the depth map generation techniques described herein, relatively accurate depth maps of a dynamic environment such as an ongoing concert, sporting event, play, etc. in which items in the environment may move or be changed during the event, can be generated. By communicating the updated depth information, e.g., in the form of a 3D model of the environment or updates to an environmental model, improved 3D simulations can be achieved which can be in turn used for enhanced 3D playback and/or viewing experience. The improvements in 3D environmental simulation can be achieved over systems which use static depth maps since the environmental model onto which images captured in the environment to be simulated will more accurately reflect the actual environment than in cases where the environmental model is static.

It should be appreciated that as changes to the environment in which images are captured by the stereoscopic camera occur, such changes can be readily and timely reflected in the model of the environment used by a playback device to display the captured images.

BRIEF DESCRIPTION OF THE DRAWINGS

FIG. 12, shows how FIGS. 12A and 12B in combination comprise FIG. 12.

DETAILED DESCRIPTION

The present invention is related to the field of panoramic imagery and more particularly, to an apparatus suitable for capturing high-definition, high dynamic range, high frame rate stereoscopic, 360-degree panoramic video using a minimal number of cameras in an apparatus of small size and at reasonable cost while satisfying weight, and power requirements for a wide range of applications.

Stereoscopic, 360-degree panoramic video content is increasingly in demand for use in virtual reality displays. In order to produce stereoscopic, 360-degree panoramic video content with 4K or greater of resolution, which is important for final image clarity, high dynamic range, which is important for recording low-light content, and high frame rates, which are important for recording detail in fast moving content (such as sports), an array of professional grade, large-sensor, cinematic cameras or other cameras of suitable quality are often needed.

In order for the camera array to be useful for capturing 360-degree, stereoscopic content for viewing in a stereoscopic virtual reality display, the camera array should acquire the content such that the results approximate what the viewer would have seen if his head were co-located with the camera. Specifically, the pairs of stereoscopic cameras should be configured such that their inter-axial separation is within an acceptable delta from the accepted human-model average of 63 mm. Additionally, the distance from the panoramic array's center point to the entrance pupil of a camera lens (aka nodal offset) should be configured such that it is within an acceptable delta from the accepted human-model average of 101 mm.

In order for the camera array to be used to capture events and spectator sports where it should be compact and non-obtrusive, it should be constructed with a relatively small physical footprint allowing it to be deployed in a wide variety of locations and shipped in a reasonable sized container when shipping is required.

The camera array should also be designed such that the minimum imaging distance of the array to be small, e.g., as small as possible, which minimizes the "dead zone" where scene elements are not captured because they fall outside of the field of view of adjacent cameras.

It would be advantageous if the camera array can be calibrated for optical alignment by positioning calibration targets where the highest optical distortion is prone to occur (where lens angles of view intersect and the maximum distortion of the lenses occur). To facilitate the most efficacious calibration target positioning, target locations should, and in some embodiments are, determined formulaically from the rig design.

Figure 1:
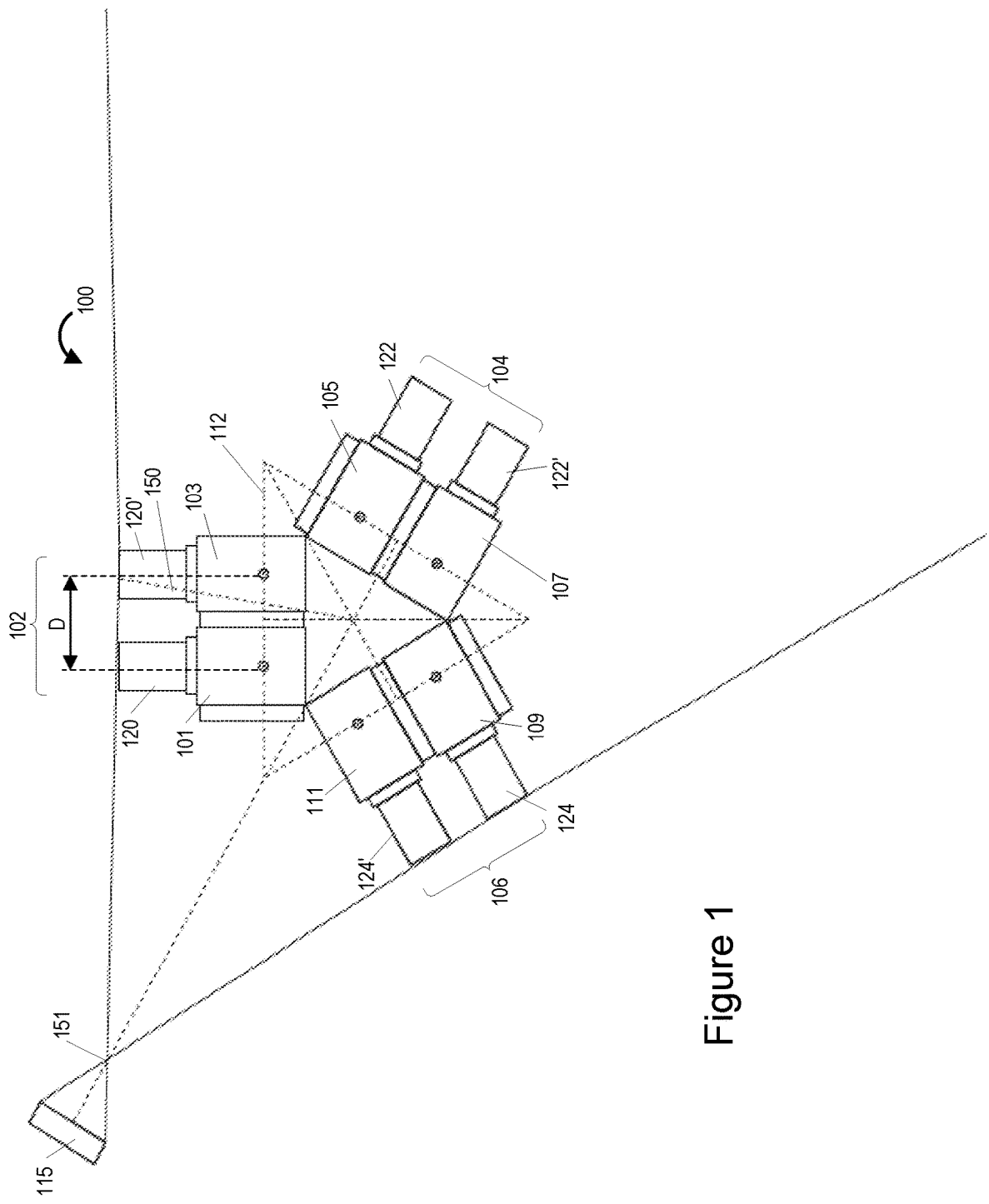
FIG. 1 illustrates an exemplary camera rig implemented in accordance with one embodiment along with a calibration target which may be used to for calibrating the camera rig.
Figure 4:
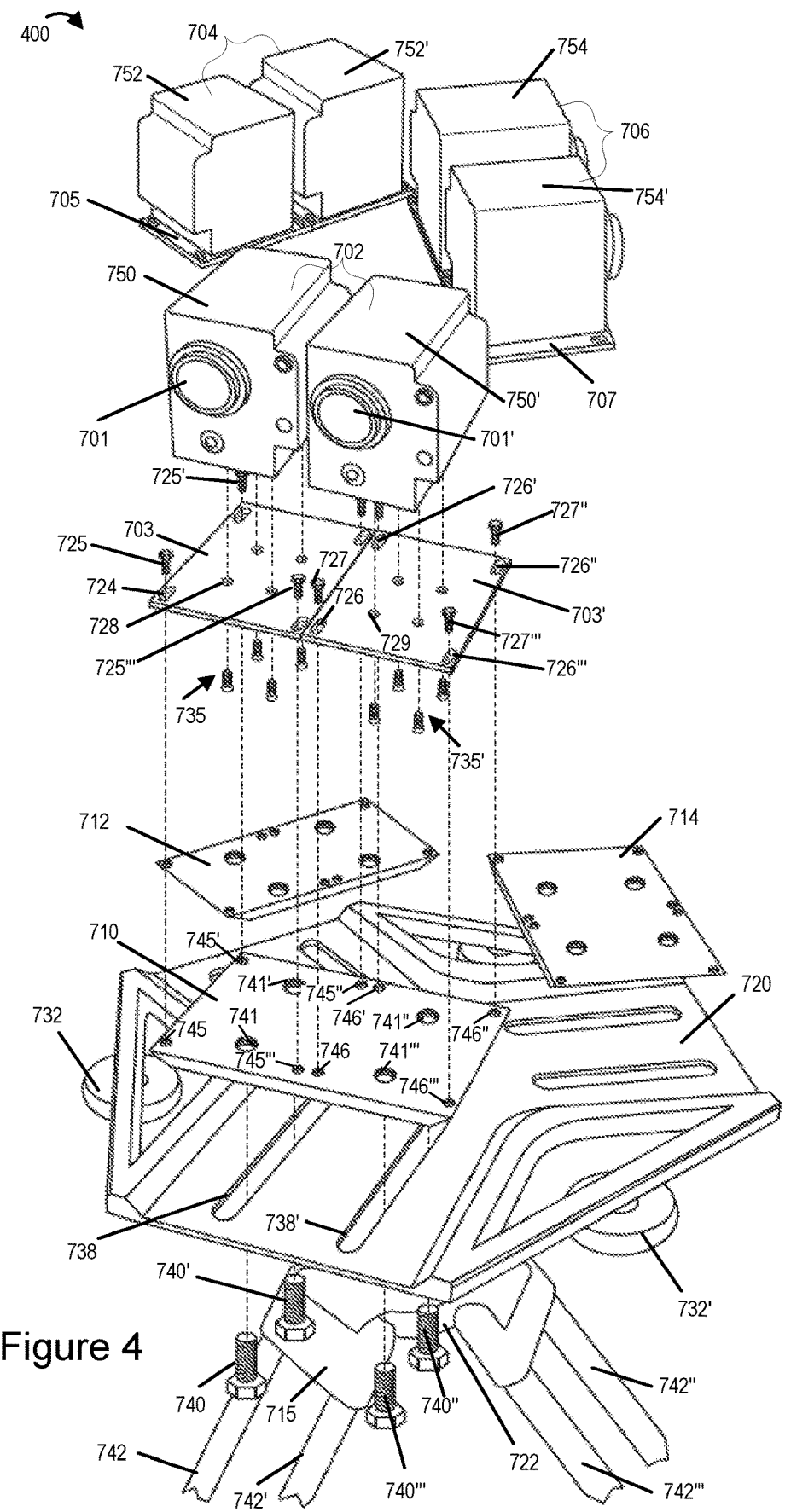
FIG. 4 illustrates another exemplary camera rig implemented in accordance with an exemplary embodiment with various elements of the camera rig being shown for clarity in partially disassembled form.
Figure 5:
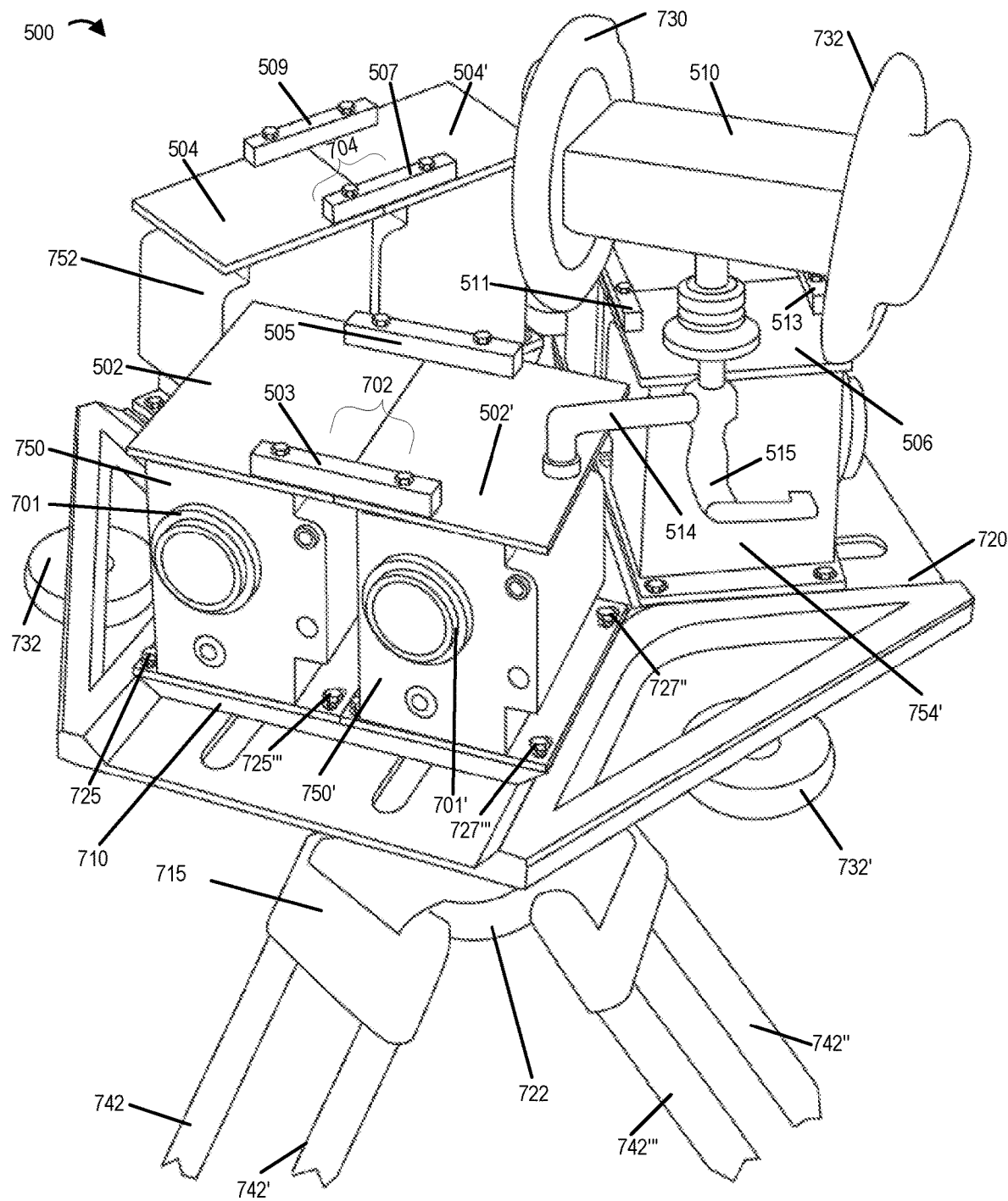
FIG. 5 shows the camera rig of FIG. 4 with the cameras mounted thereon along with an audio capture device including ear shaped devices including microphones used for capturing stereo audio.

FIG. 1 shows an exemplary camera configuration 100 used in some embodiments. The support structure shown in FIGS. 4 and 5 is not shown in FIG. 1 to allow for better appreciation of the camera pair arrangement shown used in some embodiments.

While in some embodiments three camera pairs are used such as in the FIG. 1 example in some but not all embodiments a camera array, e.g., the camera positions of the rig, is populated with only 2 of the 6-total cameras which maybe used to support simultaneous 360-degree stereoscopic video. When the camera rig or assembly is configured with less than all 6 cameras which can be mounted in the rig, the rig is still capable of capturing the high-value, foreground 180-degree scene elements in real-time while manually capturing static images of the lower-value, background 180-degree scene elements, e.g., by rotating the rig when the foreground images are not being captured. For example, in some embodiments when a 2-camera array is used to capture a football game with the field of play at the 0-degree position relative to the cameras, the array is manually rotated around the nodal point into the 120-degree and 240-degree positions. This allows the action on the field of a sports game or match, e.g., foreground, to be captured in real time and the sidelines and bleachers, e.g., background areas, to be captured as stereoscopic static images to be used to generate a hybridized panorama including real time stereo video for the front portion and static images for the left and right rear portions. In this manner, the rig can be used to capture a 360 degree view with some portions of the 360 view being captured at different points in time with the camera rig being rotated around its nodal axis, e.g., vertical center point between the different points in time when the different view of the 360 scene area are captured. Alternatively, single cameras may be mounted in the second and third camera pair mounting positions and mono (non-stereoscopic) image content captured for those areas.

In other cases where camera cost is not an issue, more than two cameras can be mounted at each position in the rig with the rig holding up to 6 cameras as in the FIG. 1 example. In this manner, cost effect camera deployment can be achieved depending on the performance to be captured and, the need or ability of the user to transport a large number, e.g., 6 cameras, or the user's ability to transport fewer than 6 cameras, e.g., 2 cameras. In some embodiments an environmental depth map is generated from the images captured by the cameras in the camera rig 100.

FIG. 1 depicts a six (6) camera assembly 100 also sometimes referred to as a rig or camera array, along with a calibration target 115. The camera rig 100 illustrated in FIG. 1 includes a support structure (shown in FIGS. 4 and 5) which holds the cameras in the indicated positions, 3 pairs 102, 104, 106 of stereoscopic cameras (101, 103), (105, 107), (109, 111) for a total of 6 cameras. The support structure includes a base 720 also referred to herein as a mounting plate (see element 720 shown in FIG. 4) which supports the cameras and to which plates on which the cameras are mounted can be secured. The support structure maybe made of plastic, metal or a composite material such as graphite or fiberglass, and is represented by the lines forming the triangle which is also used to show the spacing and relationship between the cameras. The center point at which the doted lines intersect represents the center nodal point around which the camera pairs 102, 104, 106 can be rotated in some but not necessarily all embodiments. The center nodal point corresponds in some embodiments to a steel rod or threaded center mount, e.g., of a tripod base, around which a camera support frame represented by the triangular lines can be rotated. The support frame may be a plastic housing in which the cameras are mounted or tripod structure as shown in FIGS. 4 and 5.

In FIG. 1, each pair of cameras 102, 104, 106 corresponds to a different camera pair position. The first camera pair 102 corresponds to a 0 degree forward to front facing position and normally meant to cover the foreground where the main action occurs. This position normally corresponds to the main area of interest, e.g., a field upon which a sports game is being played, a stage, or some other area where the main action/performance is likely to occur. The second camera pair 104 corresponds to a 120 degree camera position (approximately 120 degree from the front facing) degree position) and is used to capture a right rear viewing area. The third camera pair 106 corresponds to a 240 degree viewing position (approximately 240 degree from the front facing) and a left rear viewing area. Note that the three camera positions are 120 degrees apart.

Each camera viewing position includes one camera pair in the FIG. 1 embodiment, with each camera pair including a left camera and a right camera which are used to capture images. The left camera captures what are sometimes referred to as a left eye images and the right camera captures what is sometime referred to as right eye images. The images may be part of a view sequence or still image captured at one or more times. Normally at least the front camera position corresponding to camera pair 102 will be populated with high quality video cameras. The other camera positions may be populated with high quality video cameras, lower quality video cameras or a single camera used to capture still or mono images. In some embodiments the second and third camera embodiments are left unpopulated and the support plate on which the cameras are mounted is rotated allowing the first camera pair 102 to capture images corresponding to all three camera positions but at different times. In some such embodiments left and right rear images are captured and stored and then video of the forward camera position is captured during an event. The captured images may be encoded and streamed in real time, e.g. while an event is still ongoing, to one or more playback devices.

The first camera pair 102 shown in FIG. 1 includes a left camera 101 and a right camera 103. The left camera has a first lens assembly 120 secured to the first camera and the right camera 103 has a second lens assembly secured to the right camera 103. The lens assemblies 120, 120' include lenses which allow for a wide angle field of view to be captured. In some embodiments each lens assembly 120, 120' includes a fish eye lens. Thus each of the cameras 102, 103 can capture a 180 degree field of view or approximately 180 degrees. In some embodiments less than 180 degrees is captured but there is still at least some overlap in the images captured from adjacent camera pairs in some embodiments. In the FIG. 1 embodiment a camera pair is located at each of the first (0 degree), second (120 degree), and third (240 degree) camera mounting positions with each pair capturing at least 120 degrees or more of the environment but in many cases with each camera pair capturing 180 degrees or approximately 180 degrees of the environment.

Second and third camera pairs 104, 106 are the same or similar to the first camera pair 102 but located at 120 and 240 degree camera mounting positions with respect to the front 0 degree position. The second camera pair 104 includes a left camera 105 and left lens assembly 122 and a right camera 107 and right camera lens assembly 122'. The third camera pair 106 includes a left camera 109 and left lens assembly 124 and a right camera 111 and right camera lens assembly 124'.

In FIG. 1, D represents the inter-axial distance of the first 102 stereoscopic pair of cameras 101, 103. In the FIG. 1 example D is 117 mm which is the same or similar to the distance between pupils of the left and right eyes of an average human being. Dashed line 150 in FIG. 1 depicts the distance from the panoramic array's center point to the entrance pupil of the right camera lens 120' (aka nodal offset). In one embodiment corresponding to the FIG. 1 which example the distance indicated by reference number 150 is 315 mm but other distances are possible.

In one particular embodiment the footprint of the camera rig 100 is relatively small. Such a small size allows the camera rig to be placed in an audience, e.g., at a seating position where a fan or attendance might normally be located or positioned. Thus in some embodiments the camera rig is placed in an audience area allowing a viewer to have a sense of being a member of the audience where such an effect is desired. The footprint in some embodiments corresponds to the size of the base to which the support structure including, in some embodiments a center support rod is mounted or support tower is located. As should be appreciated the camera rigs in some embodiments can rotate around the center point of the base which corresponds to the center point between the 3 pairs of cameras. In other embodiments the cameras are fixed and do not rotate around the center of the camera array.

The camera rig 100 is capable of capturing relatively close as well as distinct object. In one particular embodiment the minimum imaging distance of the camera array is 649 mm but other distances are possible and this distance is in no way critical.

The distance from the center of the camera assembly to the intersection point 151 of the views of the first and third camera parts represents an exemplary calibration distance which can be used for calibrating images captured by the first and second camera pairs. In one particular exemplary embodiment, an optimal calibration distance, where lens angles of view intersect and the maximum distortion of the lenses occur is 743 mm. Note that target 115 may be placed at a known distance from the camera pairs located at or slightly beyond the area of maximum distortion. The calibration target include a known fixed calibration pattern. The calibration target can be and is used for calibrating the size of images captured by cameras of the camera pairs. Such calibration is possible since the size and position of the calibration target is known relative to the cameras capturing the image of the calibration target 115.

Figure 2:
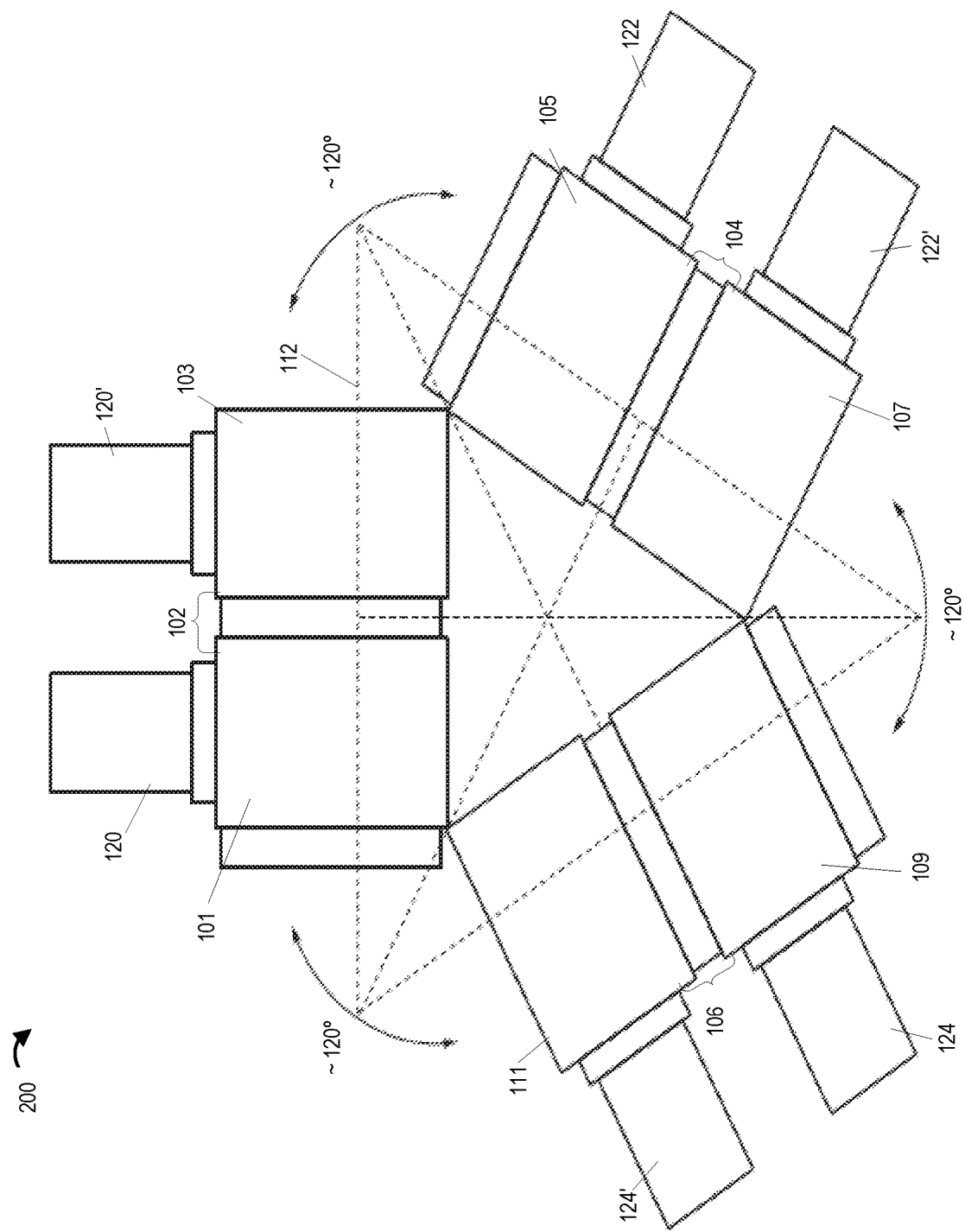
FIG. 2 illustrates the camera rig with three pairs of cameras, e.g., 3 pairs of cameras capturing stereoscopic image data, mounted in the camera rig.

FIG. 2 is a diagram 200 of the camera array 100 shown in FIG. 1 in greater detail. While the camera rig 100 is again shown with 6 cameras, in some embodiment the camera rig 100 is populated with only two cameras, e.g., camera pair 102 including cameras 101 and 103. As shown there is a 120 degree separation between each of the camera pair mounting positions. Consider for example if the center between each camera pair corresponds to the direction of the camera mounting position. In such a case the first camera mounting position corresponds to 0 degrees, the second camera mounting position corresponds to 120 degrees and the third camera mounting position corresponding to 240 degrees. Thus each camera mounting position is separated by 120 degrees. This can be seen if the center line extending out through the center of each camera pair 102, 104, 106 was extended and the angle between the lines measured.

In the FIG. 2 example, the pair 102, 104, 106 of cameras can, and in some embodiments do, rotate around the center point of the camera rig allowing for different views to be captured at different times without having to alter the position of the camera rig base. That is, the cameras can be rotated around the center support of the rig and allowed to capture different scenes at different times allowing for a 360 degree scene capture using the rig shown in FIG. 2 while it is populated with only two cameras. Such a configuration is particularly desirable from a cost perspective given the cost of stereoscopic cameras and is well suited for many applications where it may be desirable to show a background captured from the same point of view but at a different time than the time at which the front scene including the main action during a sporting event or other event may occur. Consider for example that during the event objects may be placed behind the camera that it would be preferable not to show during the main event. In such a scenario the rear images may be, and sometimes are, captured prior to the main event and made available along with the real time captured images of the main event to provide a 360 degree set of image data.

Figure 3:
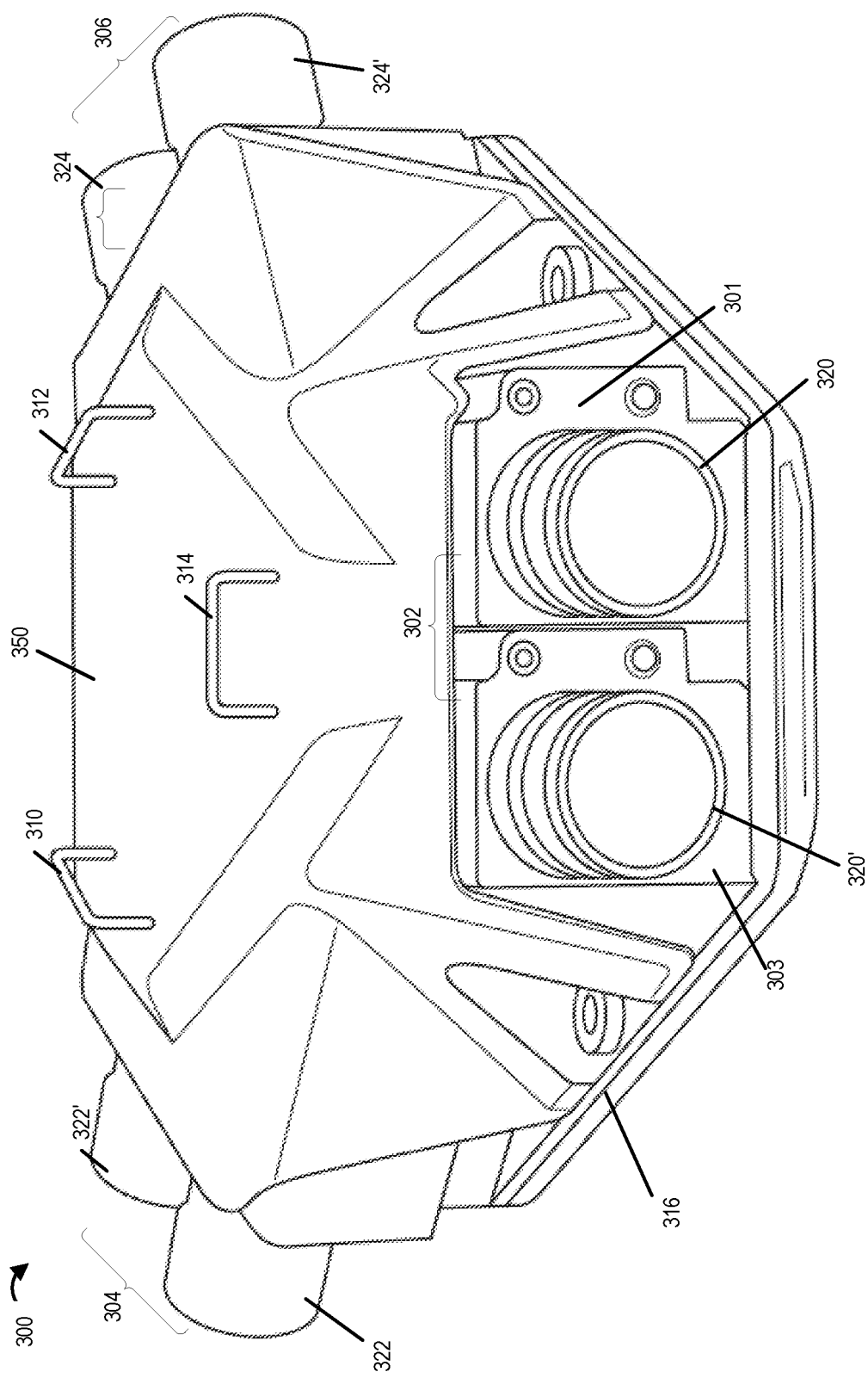
FIG. 3 illustrates an exemplary camera rig with an exemplary protective cover implemented in accordance with some exemplary embodiments.

FIG. 3 shows an exemplary camera rig 300 which is the same or similar to the rig of FIGS. 1 and 2 but without a support tripod and with a plastic cover 350 placed over the camera pairs. The plastic cover 350 includes handles 310, 312, 314 which can be used to lift or rotate, e.g., when placed on a tripod, the camera rig 300. The camera rig 300 is shown with three pairs of cameras, a first camera pair 302 including cameras 301, 303 with lens assemblies 320, 320', a second camera pair 304 including cameras with lens assemblies 322, 322', and a third camera pair 306 including cameras with lens assemblies 324, 324'. The plastic cover 350 is secured to the mounting platform 316, which may be implemented as a flat plate with one or more slots and screw holes as shown in FIG. 4. The plastic cover 350 is secured to the base with nuts or screws 330, 331 which can be removed or tightened by hand to allow for easy removal or attachment of the cover 350 and easy access to the cameras of the camera pairs. While six cameras are included in the rig 300 shown in FIG. 3, a single camera pair may be included and/or a single camera pair with one or more individual cameras located at the other camera mounting positions where the camera pairs are not mounted may be used.

FIG. 4 is a detailed diagram of a camera rig assembly 400 shown in partially disassembled form to allow better view of how the components are assembled. The camera rig 400 is implemented in accordance with one exemplary embodiment and may have the camera configuration shown in FIGS. 1 and 2. In the example shown in FIG. 4 various elements of the camera rig 400 are shown in disassembled form for clarity and detail. As can be appreciated from FIG. 4, the camera rig 400 includes 3 pairs of cameras 702, 704 and 706, e.g., stereoscopic cameras, which can be mounted on a support structure 720 of the camera rig 400. The first pair of cameras 702 includes cameras 750 and 750'. The second pair of cameras 704 includes cameras 752, 752' and the third pair of cameras 706 includes cameras 754, 754'. The lenses 701, 701' of the cameras 750, 750' can be seen in FIG. 7. While elements 701 and 701' are described as lenses, in some embodiments they are lens assemblies which are secured to the cameras 750, 750 with each lens assembly including multiple lenses positioned in a lens barrel which is secured to the cameras 750, 750' via a friction fit or twist lock connection.

In some embodiments the three pairs (six cameras) of cameras 702, 704 and 706 are mounted on the support structure 720 via the respective camera pair mounting plates 710, 712 and 714. The support structure 720 may be in the form of a slotted mounting plate 720. Slot 738 is exemplary of some of the slots in the plate 720. The slots reduce weight but also allow for adjustment of the position of the camera mounting plates 710, 712, 714 used to support camera pairs or in some cases a single camera.

The support structure 720 includes three different mounting positions for mounting the stereoscopic camera pairs 702, 704, 706, with each mounting position corresponding to a different direction offset 120 degrees from the direction of the adjacent mounting position. In the illustrated embodiment of FIG. 7, the first pair of stereoscopic cameras 702 is mounted in a first one of the three mounting positions, e.g., front facing position, and corresponds to a front viewing area. The second pair 704 of stereoscopic cameras 704 is mounted in a second one of the three mounting positions, e.g., background right position rotating 120 degrees clockwise with respect the front position, and corresponds to a different right rear viewing area. The third pair 706 of stereoscopic cameras is mounted in a third one of the three mounting positions, e.g., background left position rotating 240 degrees clockwise with respect the front position, and corresponds to a left rear viewing area. The cameras in each camera position capture at least a 120 viewing area but may capture in many case at least a 180 degree viewing area resulting in overlap in the captured images which can facilities combining of the images into a 360 degree view with some of the overlapping portions being cut off in some embodiments.

The first camera pair mounting plate 710 includes threaded screw holes 741, 741', 741" and 741''' through which screws 704, 740', 740", 740''' can be inserted, respectively through slots 738 and 738'; to secure the plate 710 to the support structure 720. The slots allow for adjustment of the position of the support plate 710.

The cameras 750, 750' of the first camera pair are secured to individual corresponding camera mounting plates 703, 703' using screws that pass through the bottom of the plates 703, 703' and extend into threaded holes on the bottom of the cameras 750, 750'. Once secured to the individual mounting plates 703, 703' the cameras 750, 750' and mounting plates 703, 703' can be secured to the camera pair mounting plate 710 using screws. Screws 725, 725', 725" (which is not fully visible) and 725''' pass through corresponding slots 724 into threaded holes 745, 745', 745" and 745''' of the camera pair mounting plate 710 to secure the camera plate 703 and camera 750 to the camera pair mounting plate 710. Similarly, screws 727, 727'(which is not fully visible), 727" and 727''' pass through corresponding slots 726, 726', 726" and 726''' into threaded holes 746, 746', 746" and 746''' of the camera pair mounting plate 710 to secure the camera plate 703' and camera 750' to the camera pair mounting plate 710.

The support structure 720 has standoff rollers 732, 732' mounted to reduce the risk that an object moving past the support structure will get caught on the support structure as it moves nearby. This reduces the risk of damage to the support structure 720. Furthermore by having a hollow area inside behind the roller an impact to the roller is less likely to be transferred to the main portion of the support structure. That is, the void behind the rollers 732, 732' allows for some deformation of the bar portion of the support structure on which the standoff roller 732' is mounted without damage to the main portion of the support structure including the slots used to secure the camera mounting plates.

In various embodiments the camera rig 400 includes a base 722 to which the support structure 720 is rotatable mounted e.g. by a shaft or threaded rod extending trough the center of the base into the support plate 720. Thus in various embodiments the camera assembly on the support structure 720 can be rotated 360 degrees around an axis that passes through the center of the base 722. In some embodiments the base 722 may be part of a tripod or another mounting device. The tripod includes legs formed by pairs of tubes (742, 742'), (742" and 742"') as well as additional leg which is not visible in FIG. 4 due to the viewing angle. The legs are secured by a hinge to the base 722 and can be folded for transport. The support structure maybe made of plastic, metal or a composite material such as graphite or fiberglass or some combination thereof. The camera pairs can be rotated around a central point, sometimes referred to as center nodal point, in some embodiments.

The assembly 400 shown in FIG. 4 allows for the position of individual cameras to be adjusted from the top by loosing the screws securing the individual camera mounting plates to the camera pair mounting plate and then adjusting the camera position before retightening the screws. The position of a camera pair can be adjusted by moving the camera pair mounting plate after loosening the screws accessible from the bottom side of the support structure 720, moving the plate and then retightening the screws. Accordingly, what the general position and direction of the camera pairs is defined by the slots in the support plate 720, the position and direction can be finely adjusted as part of the camera calibration process to achieve the desired camera alignment while the cameras are secured to the support structure 720 in the field where the camera rig is to be used.

In FIG. 5 reference numbers which are the same as those used in FIG. 4 refer to the same elements. FIG. 5 illustrates a drawing 500 showing the exemplary camera rig 400 in assembled form with additional stabilization plates 502, 502', 504, 504', 506 and stabilization plate joining bars 503, 505, 507, 509, 511, 513 added to the tops of the camera pairs to increase the rigidity and stability of the cameras pairs after they have been adjusted to the desired positions.

In the drawing 500 the camera pairs 702, 704, 706 can be seen mounted on the support structure 720 with at least one of the camera pair mounting plate 710 being visible in the illustrated drawing. In addition to the elements of camera rig 400 already discussed above with regard to FIG. 4, in drawing 500 two simulated ears 730, 732 mounted on the camera rig can also be seen. These simulated ears 730, 732 imitate human ears and in some embodiments are made from silicone or plastic molded in the shape of a human ear. Simulated ears 730, 732 include microphones with the two ears being separated from each other by a distance equal to, or approximately equal to, the separation between human ears of an average human. The microphones mounted in the simulated ears 730, 732 are mounted on the front facing camera pair 702 but could alternatively be mounted on the support structure, e.g., platform, 720. The simulated ears 730, 732 are positioned perpendicular to the front surface of the camera pair 702 in a similar manner as human ears are positioned perpendicular to the front surface of eyes on a human head. Holes in the side of the simulated ears 730, 732 act as an audio/sound entry point to the simulated ears with the simulated ears and hole operating in combination to direct audio towards a microphone mounted in each one of the simulated ears much as a human ear directs audio sounds into the eardrum included in a human ear. The microphones in the left and right simulated ears 730, 732 provide for stereo sound capture similar to what a human at the location of the camera rig 500 would perceive via the human's left and right ears if located at the position of the camera rig. The audio input of the microphones mounted in the simulate ears is perpendicular to the face of the outer lens of front facing cameras 750, 750' in the same manner that the sensor portion of a human ear would be somewhat perpendicular to the humans beings face. The simulate ears direct sound into toward the microphone just as a human ear would direct sound waves towards a human ear drum.

The simulated ears 730, 730 are mounted on a support bar 510 which includes the microphones for capturing sound. The audio capture system 730, 732, 810 is supported by a movable arm 514 which can be moved via handle 515.

While FIGS. 4-5 illustrate one configuration of an exemplary camera rig with three stereoscopic camera pairs, it should be appreciated that other variations are possible. For example, in one implementation the camera rig 400 includes a single pair of stereoscopic cameras which can rotate around the center point of the camera rig allowing for different 120 degree views to be captured at different times. Thus a single camera pair can be mounted on the support structure and rotated around the center support of the rig and allowed to capture different scenes at different times allowing for a 360 degree scene capture.

In other embodiments the camera rig 400 includes a single stereoscopic camera pair 702 and one camera mounted in each of the second and third positions normally used for a pair of stereoscopic cameras. In such an embodiment a single camera is mounted to the rig in place of the second camera pair 704 and another single camera is mounted to the camera rig in place of the camera pair 706. Thus, in such an embodiment, the second camera pair 704 may be thought of as being representative of a single camera and the camera pair 706 may be thought of as being illustrative of the additional single camera.

FIGS. 6-9 illustrate various views of other exemplary camera rigs implemented in accordance with some exemplary embodiments.

Figure 6:
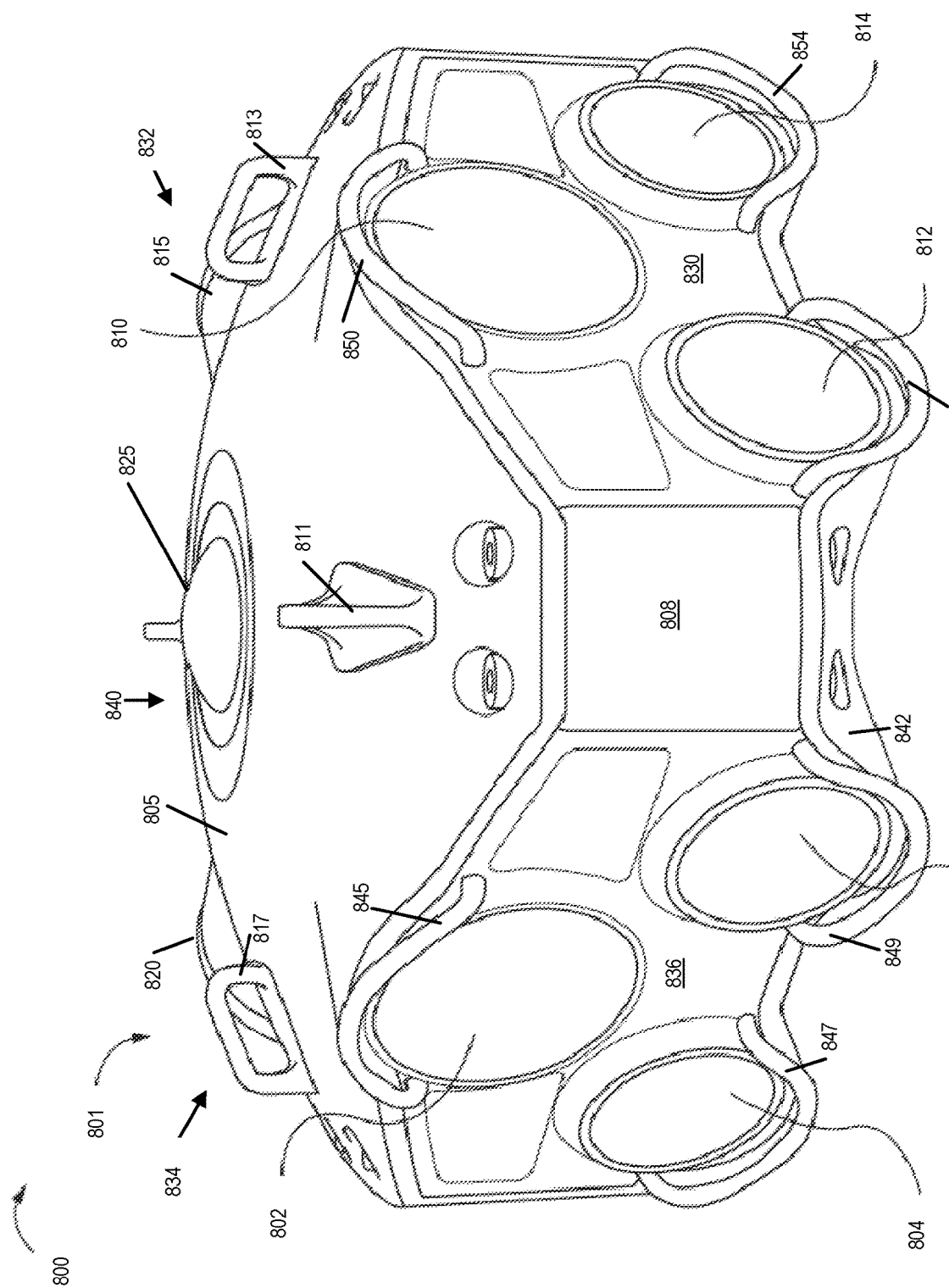
FIGS. 6-8 illustrate various views of an exemplary camera rig implemented in accordance with some exemplary embodiments.

FIG. 6 illustrates a drawing 800 showing one view of an exemplary camera rig 801 implemented in accordance with some exemplary embodiments. An array of cameras is included in the camera rig 801 some of which are stereoscopic cameras. In the illustrated view of the camera rig 801 in drawing 800, only a portion of the camera rig 801 is visible while a similar arrangement of cameras exist on the other sides (also referred to as different faces) of the camera rig 801 which cannot be fully seen in the drawing 800. In some but not all embodiments, the camera rig 801 includes 13 cameras secured by a top plastic body or cover 805 and a bottom base cover 842. In some embodiments 8 of these 13 cameras are stereoscopic cameras such as the cameras 804, 806, 812 and 814 in pairs while many other cameras are light field cameras such as cameras 802 and 810 which are visible in the drawing 800 and cameras 815 and 820 which are not fully but partially visible in drawing 800. Various other combinations of the cameras are possible. In some embodiments a camera 825 is also mounted on the top portion of the camera rig 801, e.g., top face 840 of camera rig 801, to capture images of a top hemisphere of an environment of interest. The plastic body/cover 805 includes handles 811, 813, 817 which can be used to lift or rotate the camera rig 801.

In some embodiments the camera rig 801 includes one light field camera (e.g., camera 802) and two other cameras (e.g., cameras 804, 806) forming a stereoscopic camera pair on each longer side of the camera rig 801. In some such embodiments there are four such longer sides (also referred to as the four side faces 830, 832, 834 and 836) with each longer side having one light field camera and one stereoscopic camera pair, e.g., light field camera 802 and stereoscopic camera pair 804, 806 on one longer side 836 to the left while another light field camera 810 and stereoscopic camera pair 812, 814 on the other longer side 830 to the right can be seen in drawing 800. While the other two side faces are not fully shown in drawing 800, they are shown in more detail in FIG. 8. In some embodiments at least some of the cameras, e.g., stereoscopic cameras and the light field cameras, in the camera rig 801 use a fish eye lens. In various embodiments each of the cameras in the camera rig 801 is protected by a corresponding lens/camera guard to protect the camera and/or lens against a physical impact and/or damage that may be caused by an object. For example cameras 802, 804 and 806 are protected by guards 845, 847 and 849 respectively. Similarly cameras 810, 812 and 814 are protected by guards 850, 852 and 854 respectively.

In addition to the stereoscopic camera pair and the light field camera on each of the four side faces 830, 832, 834 and 836, in some embodiments the camera rig 801 further includes a camera 825 facing in the upward vertical direction, e.g., towards the sky or another top ceiling surface in the case of a closed environment, on the top face 840 of the camera rig 801. In some such embodiments the camera 825 on the top face of the camera rig 801 is a light field camera. While not shown in drawing 800, in some other embodiments the top face 840 of the camera rig 801 also includes, in addition to the camera 825, another stereoscopic camera pair for capturing left and right eye images. While in normal circumstances the top hemisphere (also referred to as the sky portion) of a 360 degree environment, e.g., stadium, theater, concert hall etc., captured by the camera 825 may not include action and/or remain static in some cases it may be important or desirable to capture the sky portion at the same rate as other environmental portions are being captured by other cameras on the rig 801.

Figure 8:
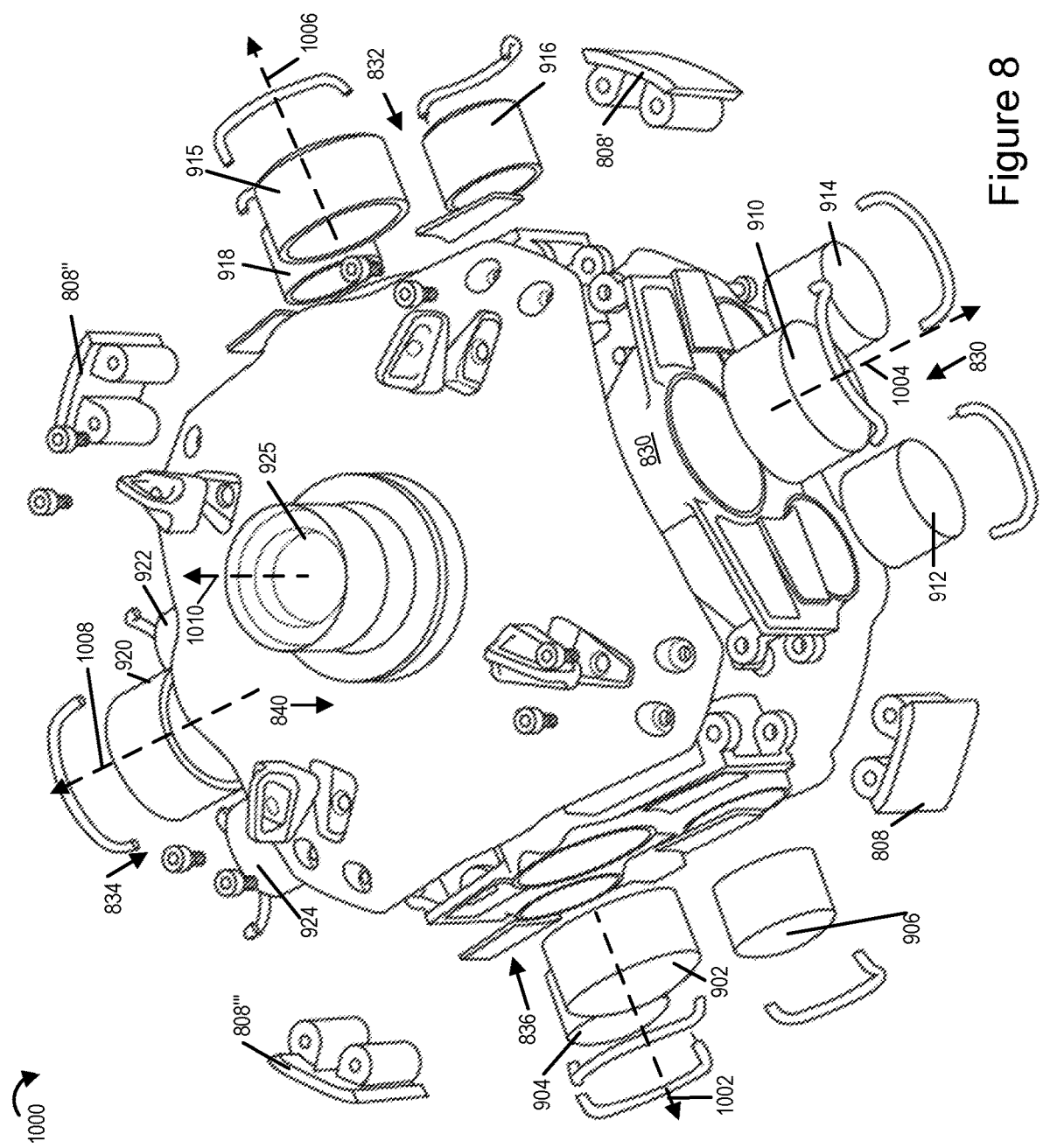

While one exemplary camera array arrangement is shown and discussed above with regard to camera rig 801, in some other implementations instead of just a single light field camera (e.g., such as cameras 802 and 810) arranged on top of a pair of stereoscopic cameras (e.g., cameras 804, 806 and 812, 814) on four faces 830, 832, 834, 836 of the camera rig 801, the camera rig 801 includes an array of light field cameras arranged with stereoscopic camera pair. For example in some embodiments there are 3 light field cameras arranged on top of a stereoscopic camera pair on each of the longer sides of the camera rig 801. In another embodiment there are 6 light field cameras arranged on top of stereoscopic camera pair on each of the longer sides of the camera rig 801, e.g., with two rows of 3 light field cameras arranged on top of the stereoscopic camera pair. Some of such variations are discussed with regard to FIGS. 12-13. Moreover in another variation a camera rig of the type shown in drawing 800 may also be implemented such that instead of four faces 830, 832, 834, 836 with the cameras pointed in the horizontal direction as shown in FIG. 8, there are 3 faces of the camera rig with cameras pointing in the horizontal direction.

In some embodiments the camera rig 801 may be mounted on a support structure such that it can be rotated around a vertical axis. In various embodiments the camera rig 801 may be deployed in an environment of interest, e.g., such as a stadium, auditorium, or another place where an event to be captured is taking place. In some embodiments the light field cameras of the camera rig 801 are used to capture images of the environment of interest, e.g., a 360 degree scene area of interest, and generate depth maps which can be used in simulating a 3D environment and displaying stereoscopic imaging content.

Figure 7:
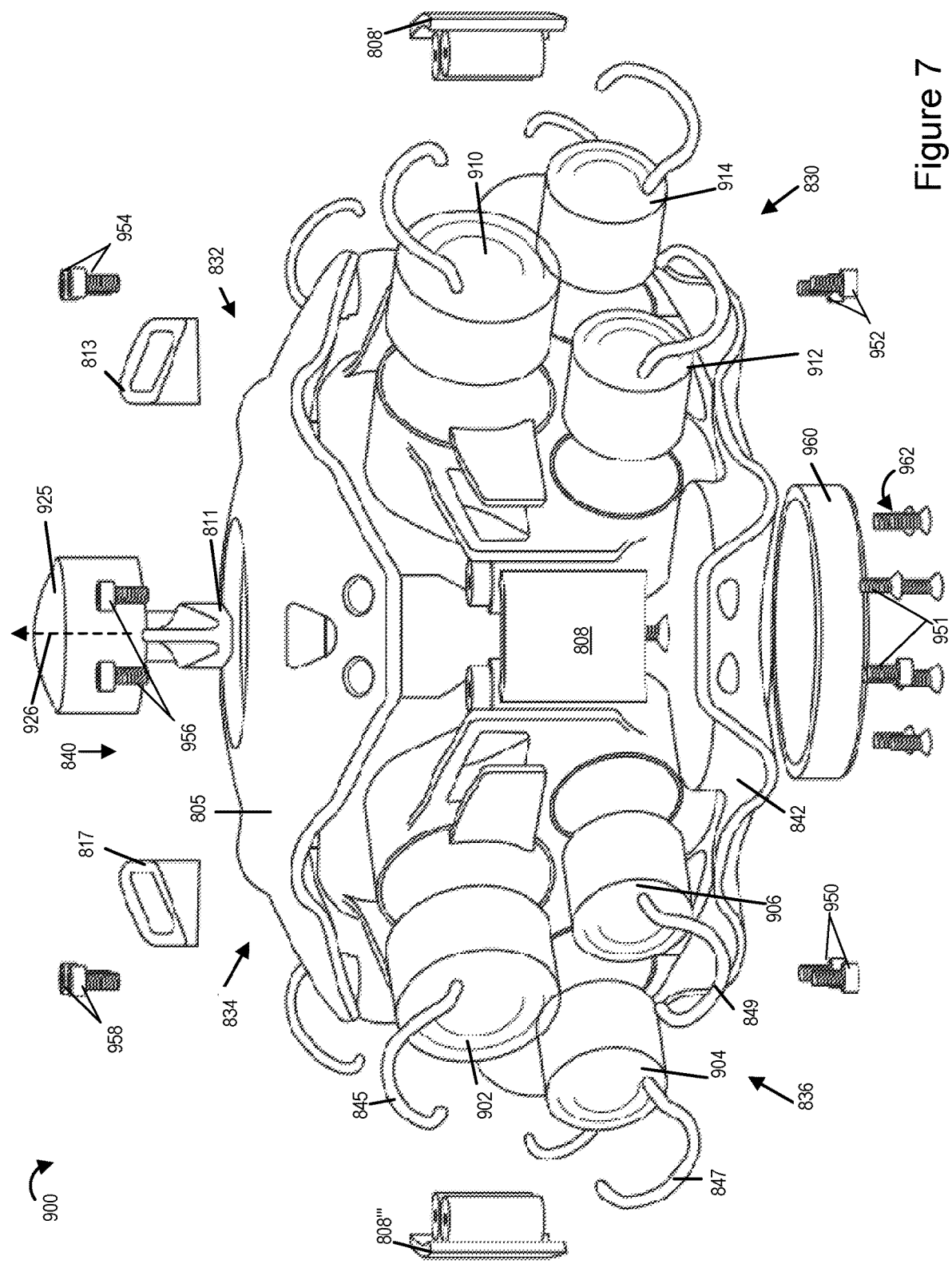

FIG. 7 illustrates a drawing 900 showing the exemplary camera rig 801 with some elements of the camera rig 801 being shown in a disassembled form for more clarity and detail. Various additional elements of the camera rig 801 which were not visible in the illustration shown in drawing 800 are shown in FIG. 7. In FIG. 7, same reference numbers have been used to identify the elements of the camera rig 801 which were shown and identified in FIG. 6. In drawing 900 at least the two side faces 830 and 836 as well as the top face 840 and bottom face 842 of the camera rig 801 are visible.

In drawing 900 various components of the cameras on two out of four side faces 830, 832, 834, 836 of the camera rig 801 are shown. The lens assemblies 902, 904 and 906 correspond to cameras 802, 804 and 806 respectively of side face 836 of the camera rig 801. Lens assemblies 910, 912 and 914 correspond to cameras 810, 812 and 814 respectively of side face 830 while lens assembly 925 corresponds to camera 825 on the top face of the camera rig 801. Also show in drawing 900 are three side support plates 808, 808', and 808''' which are support the top and bottom cover plates 805 and 842 of the camera rig 801. The side support plates 808, 808', and 808''' are secured to the top cover 805 and bottom base cover 842 via the corresponding pairs of screws shown in the Figure. For example the side support plate 808 is secured to the top and bottom cover plates 805, 842 via the screw pairs 951 and 956, the side support plate 808' is secured to the top and bottom cover plates 805, 842 via the screw pairs 952 and 954, and the side support plate 808''' is secured to the top and bottom cover plates 805, 842 via the screw pairs 950 and 958. The camera rig 801 in some embodiments includes a base support 960 secured to the bottom cover plate 842 via a plurality of screws 960. In some embodiments via the base support 960 the camera rig may be mounted on a support structure such that it can be rotated around a vertical axis, e.g., axis going through the center of base 960. The external support structure may be a tripod or another platform.

FIG. 8 illustrates a drawing 1000 showing a top view of the exemplary camera rig 801 with more elements of the camera rig 801 being shown in greater detail. In the top view of the camera rig 801 the other two side faces 832 and 834 which were not fully visible in drawings 800-900 are more clearly shown. The lens assemblies 915, 916 and 918 correspond to camera 815 and the stereoscopic camera pair on the side face 832 of the camera rig 801. Lens assemblies 920, 922 and 924 correspond to camera 920 and the stereoscopic camera pair on the side face 834 of the camera rig 801.

As can be seen in drawing 1000, the assembly of cameras on each of the four sides faces 830, 832, 834, 836 (small arrows pointing towards the faces) and the top face 840 of the camera rig 801 face in different directions. The cameras on the side faces 830, 832, 834, 836 of the camera rig 801 are pointed in the horizontal (e.g., perpendicular to the corresponding face) while the camera(s) on the top face 840 is pointed in the upward vertical direction. For example as shown in FIG. 8 the cameras on the face 836 of the camera rig 801 (cameras corresponding to lens assemblies 902, 904, 906) are facing in a first direction shown by arrow 1002. The arrow 1004 shows a second direction in which the cameras on the face 830 of the camera rig 801 (cameras corresponding to lens assemblies 910, 912, 914) are facing, arrow 1006 shows a third direction in which the cameras on the face 832 of the camera rig 801 (cameras corresponding to lens assemblies 915, 916, 918) are facing, arrow 1008 shows a fourth direction in which the cameras on the face 834 of the camera rig 801 (cameras corresponding to lens assemblies 920, 922, 924) are facing and arrow 1010 shows a fifth (vertical) direction in which the camera on the top face 840 of the camera rig 801 (camera 825 corresponding to lens assembly 925, is facing. In various embodiments the first, second, third and fourth directions are generally horizontal directions while the fifth direction is a vertical direction. In some embodiments the cameras on the different side faces 830, 832, 834 and 836 are uniformly spaced. In some embodiments the angle between the first, second, third and fourth directions is the same. In some embodiments the first, second, third and fourth directions are different and 90 degrees apart. In some other embodiments the camera rig is implemented such that instead of four side faces the camera rig has 3 side faces with the same or similar camera assemblies as shown in drawings 800-1000. In such embodiments the cameras on the side faces of the camera rig 801 point in three different directions, e.g., a first, second and third direction, with the first, second and third directions being 120 degrees apart.

Figure 9:
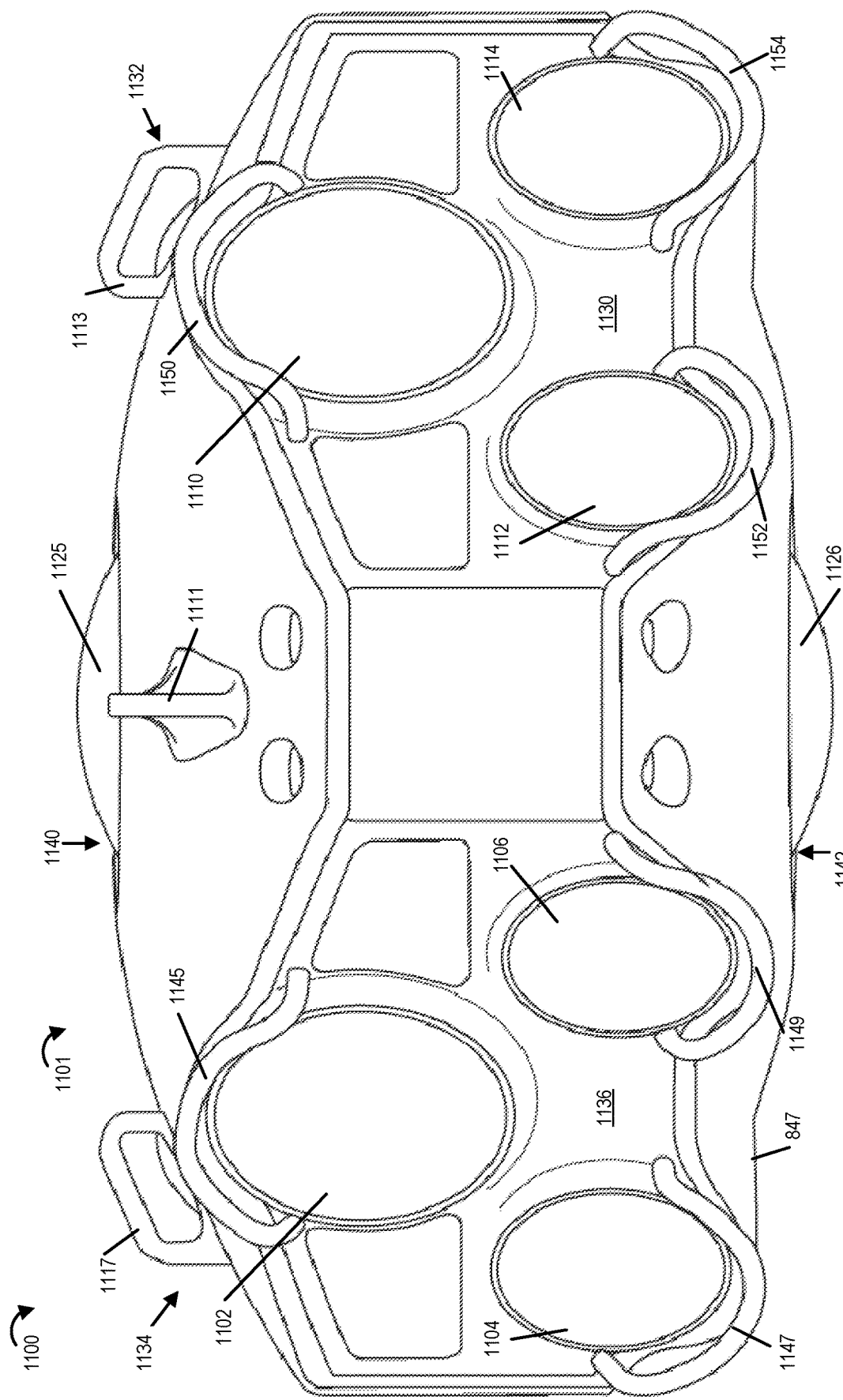
FIG. 9 illustrates yet another exemplary camera rig implemented in accordance with some exemplary embodiments.

FIG. 9 illustrates a drawing 1100 showing a view of yet another exemplary camera rig 1101 implemented in accordance with some exemplary embodiments. The exemplary camera rig 1101 is similar to the camera rig 801 in most and many aspects and includes the same or similar configuration of cameras as discussed with regard to camera rig 801 above. The camera rig 1101 includes four side faces 1130, 1132, 1134, 1136 and a top face 1140 similar to camera rig 801. Each of the four side faces 1130, 1132, 1134, 1136 of the camera rig 1101 includes an array of cameras including a light field camera and a pair of stereoscopic camera pair while the top face 1140 of camera rig includes at least one camera device 1125 similar to what has been shown and discussed with regard to camera rig 801. However the camera rig 1101 further includes, in addition to the camera arrays on each of the five faces 1130, 1132, 1134, 1136 and 1140, a sixth bottom face 1142 including at least one camera 1126 facing vertically downward, e.g., towards the ground. In some such embodiments the bottom surface camera 1126 facing vertically downwards and the top face camera 1125 facing vertically upwards are light field cameras. In some embodiments each of the cameras 1125 and 1126 are part of a corresponding stereoscopic camera pair on the top and bottom faces 1140, 1142 of the camera rig 1101.

While the stereoscopic cameras of the camera rigs 801 and 1101 are used to capture stereoscopic imaging content, e.g., during an event, the use of light field cameras allows for scanning the scene area of interest and generate depth maps of various portions of the scene area captured by the light field cameras (e.g., from the captured images corresponding to these portions of the scene of interest). In some embodiments the depth maps of various portions of the scene area may be combined to generate a composite depth map of the scene area. Such depth maps and/or composite depth map may, and in some embodiments are, provided to a playback device for use in displaying stereoscopic imaging content and simulating a 3D environment which can be experienced by the viewers.

Figure 10:
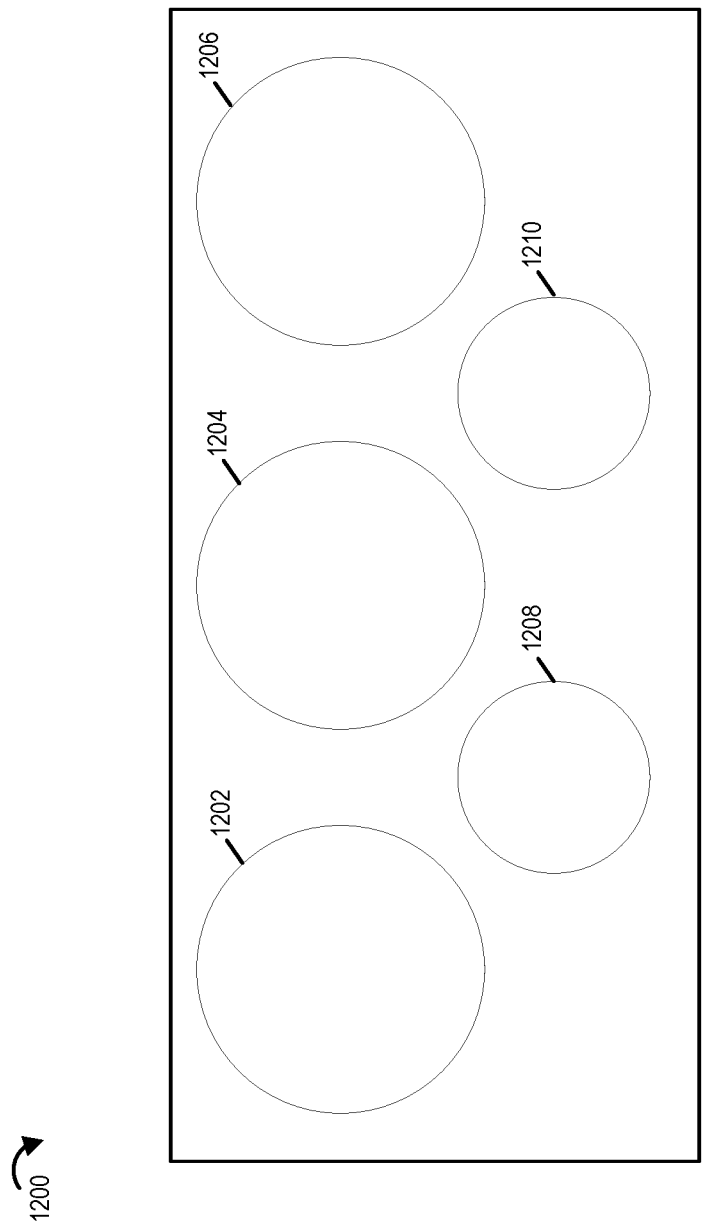
FIG. 10 illustrates a front view of an exemplary arrangement of an array of cameras that can be used in the exemplary camera rigs of the present invention such as camera rigs shown in FIGS. 1-9, in accordance with some embodiments.

FIG. 10 illustrates a front view of an exemplary arrangement 1200 of an array of cameras that can be used in an exemplary camera rig implemented in accordance with the invention such as camera rig 300, camera rig 400 and/or camera rigs 801 and 1101 in accordance with some embodiments. In comparison to the arrangement shown in drawing 800 with a single light field camera arranged on top of a pair of stereoscopic cameras on each of the faces of the camera rig 801, the exemplary arrangement 1200 uses an array of light field cameras 1202, 1204 and 1206 arranged with a stereoscopic camera pair 1208, 1210. The exemplary arrangement 1200 may be, and in some embodiments is, used in a camera rig (such as camera rig 801) implemented in accordance with the invention. In such embodiments each face of the camera rig uses the exemplary arrangement 1200 with three light field cameras (e.g., 1202, 1204 and 1206) arranged with a single pair of stereoscopic cameras (e.g., 1208, 1210). It should be appreciated that many variations in arrangement are possible and are within the scope of the invention.

Figure 11:
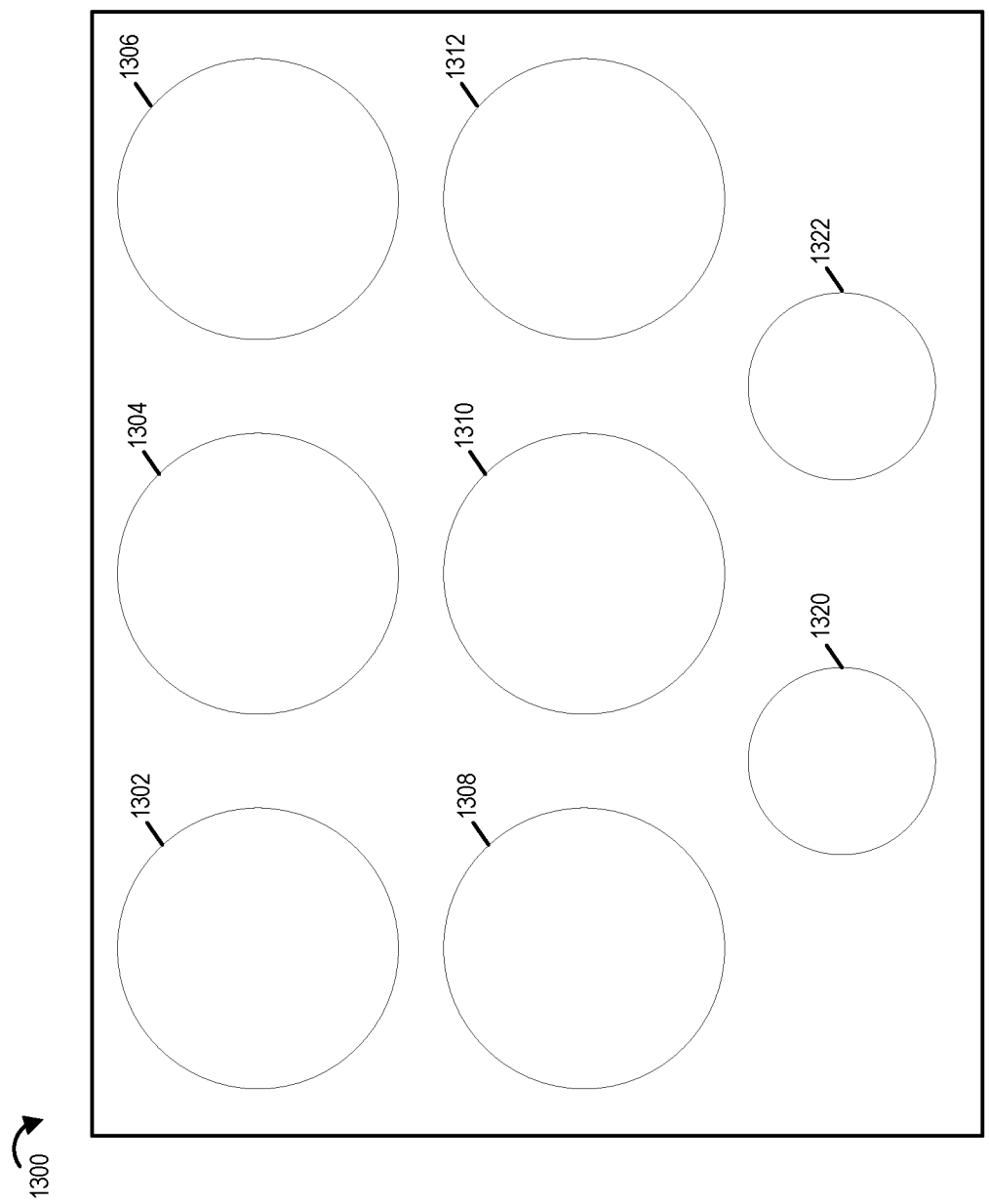
FIG. 11 illustrates a front view of yet another exemplary arrangement of an array of cameras that can be used in any of the camera rigs of the present invention.

FIG. 11 illustrates a front view of yet another exemplary arrangement 1300 of an array of cameras that can be used in an exemplary camera rig such as camera rig 801 or any of the other camera rigs discussed earlier, in accordance with some embodiments. In comparison to the arrangement shown in drawing 800 with a single light field camera arranged on top of a pair of stereoscopic cameras, the exemplary arrangement 1300 uses an array of six light field cameras 1302, 1304, 1306, 1308, 1310 and 1312 arranged with a stereoscopic camera pair 1320, 1322. The light field cameras are stacked in two rows of 3 light field cameras arranged one on top of the other with each row including a group of three light field cameras as shown. The exemplary arrangement 1300 may be, and in some embodiments is, used in a camera rig (such as camera rig 801) implemented in accordance with the invention with each face of the camera rig using the arrangement 1300.

While the stereoscopic cameras of the camera rigs discussed above are used to capture stereoscopic imaging content, e.g., during an event, the use of light field cameras allows for scanning the scene area of interest and generate depth maps of various portions of the scene area captured by the light field cameras (from the captured images corresponding to these portions of the scene of interest). In some embodiments the depth maps of various portions of the scene area may be combined to generate a composite depth map of the scene area. Such depth maps and/or composite depth map may, and in some embodiments are, provided to a playback device for use in displaying stereoscopic imaging content and simulating a 3D environment which can be experienced by the viewers.

The use of light field camera on combination with the stereoscopic cameras allows for environmental measurements and generation the environmental depth maps in real time, e.g., during an event being shot, thus obviating the need for deployment of environmental measurements to be performed offline ahead in time prior to the start of an event, e.g., a football game.

While the depth map generated from each image corresponds to a portion of the environment to be mapped, in some embodiments the depth maps generated from individual images are processed, e.g., stitched together, to form a composite map of the complete environment scanned using the light field cameras. Thus by using the light field cameras a relatively complete environmental map can be, and in some embodiments is generated.

In the case of light field cameras, an array of micro-lenses captures enough information that one can refocus images after acquisition. It is also possible to shift, after image capture, one's viewpoint within the sub-apertures of the main lens, effectively obtaining multiple views. In the case of a light field camera, depth cues from both defocus and correspondence are available simultaneously in a single capture. This can be useful when attempting to fill in occluded information/scene portions not captured by the stereoscopic cameras.

The depth maps generated from the light field camera outputs will be current and is likely to accurately measure changes in a stadium or other environment of interest for a particular event, e.g., a concert or game to be captured by a stereoscopic camera. In addition, by measuring the environment from the same location or near the location at which the stereoscopic camera are mounted, the environmental map, at least in some embodiments, accurately reflects the environment as it is likely to be perceived from the perspective of the stereoscopic cameras that are used to capture the event.

In some embodiments images captured by the light field cameras can be processed and used to fill in for portions of the environment which are not captured by a stereoscopic camera pair, e.g., because the position and/or field of view of the stereoscopic camera pair may be slightly different from that of the light field camera and/or due to an obstruction of view from the stereoscopic cameras. For example, when the light field camera is facing rearward relative to the position of the stereoscopic pair it may capture a rear facing view not visible to a forward facing stereoscopic camera pair. In some embodiments output of the light field camera is provided to a playback device separately or along with image data captured by the stereoscopic camera pairs. The playback device can use all or portions of the images captured by the light field camera when display of a scene area not sufficiently captured by the stereoscopic camera pairs is to be displayed. In addition a portion of an image captured by the light field camera may be used to fill in a portion of the a stereoscopic image that was occluded from view from the position of the stereoscopic camera pair but which a user expects to be able to see when he or she shifts his or her head to the left or right relative to the default viewing position corresponding to the location of the stereoscopic camera pair. For example, if a user leans to the left or right in an attempt to peer around a column obstructing his/her view in some embodiments content from one or more images captured by the light field camera will be used to provide the image content which was not visible to the stereoscopic camera pair but which is expected to be visible to the user from the shifted head portion the user achieves during playback by leaning left or right.

Figure 12A:
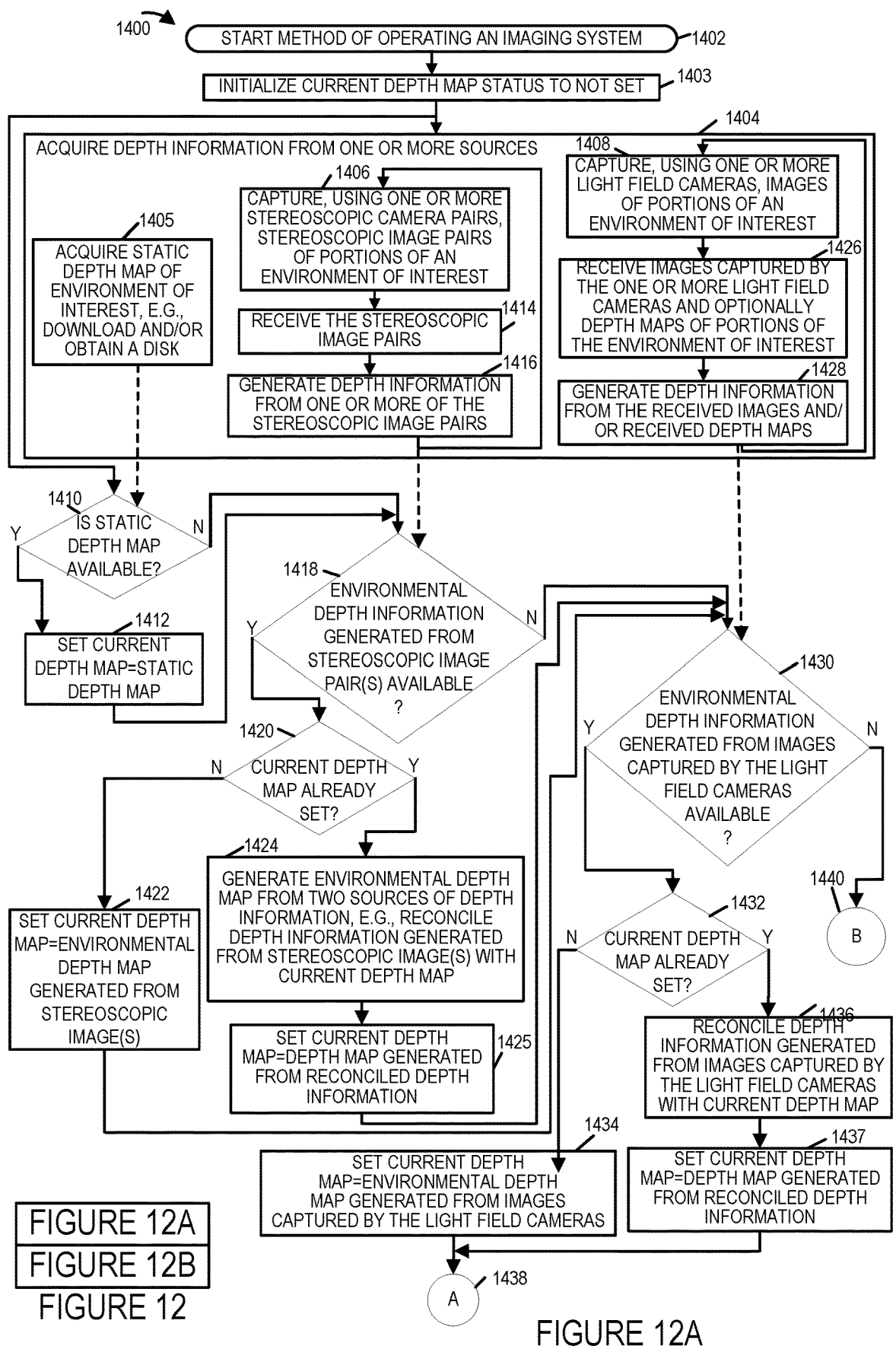
FIG. 12A is a first part of FIG. 12 which illustrates a flowchart of an exemplary method of operating an imaging system in accordance with an exemplary embodiment.
Figure 12B:
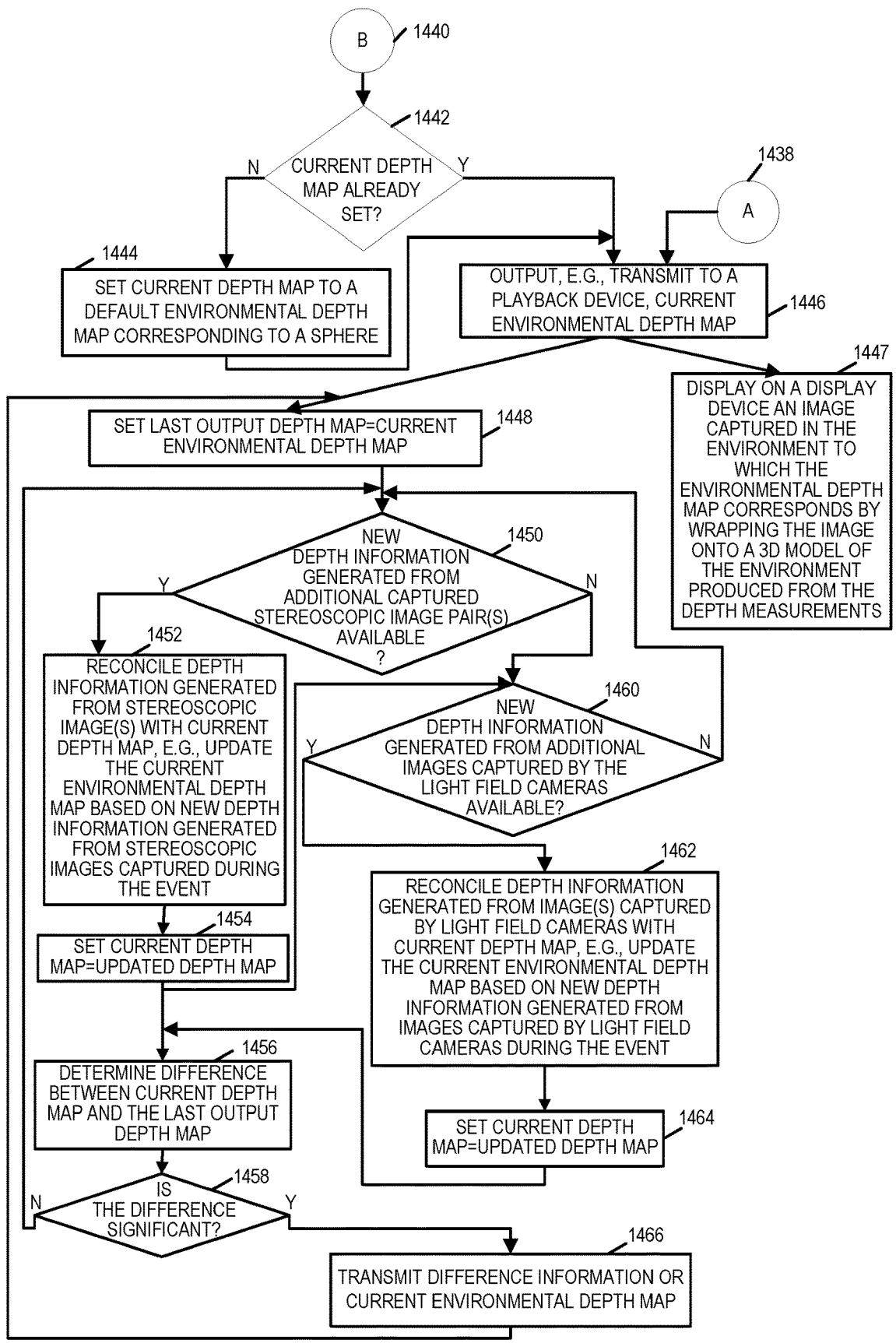
FIG. 12B is a second part of FIG. 12 which illustrates a flowchart of an exemplary method of operating the imaging system.

FIG. 12, which comprises a combination of FIGS. 12A and 12B, illustrates a flowchart 1400 of an exemplary method of operating an imaging system in accordance with some embodiments. The method of flowchart 1400 is implemented in some embodiments using the imaging system including image capturing devices and a processing system. The image capturing devices, e.g., light field cameras and/or stereoscopic cameras, in the system may be included in and/or mounted on the various camera rigs shown in the drawings and discussed in detail above. I The method starts in step 1402, e.g., with the imaging system being powered on and initialized. The method proceeds from start step 1402 to step 1403. In step 1403 a current environmental depth map status, e.g., indicating availability of an environmental depth map and/or if depth map to be used is set to an existing or default depth map, is initialized to indicate that the current environmental depth map is not set. Thus in such a case a depth map to be used and/or provided to another device needs to be selected prior to being used and/or provided.

Operation proceeds from step 1403 to step 1404 and 1410. The result of processing in step 1404 is used as an input for the determination performed in steps 1410, 1418 and 1430 as discussed below. In step 1404 environmental depth information is acquired from one or more sources. As part of step 1404 one or more of the steps 1405, 1406, 1408, 1414, 1416, 1426 and 1428 are performed in some embodiments. The steps 1405, 1406, 1408 may be performed in parallel by different elements of the imaging system, e.g., one or more cameras and a processing system. The image capture steps in the two separate paths along steps 1406 and 1408 are performed in parallel at different rates in some embodiments.

In step 1405 the processing system acquires static environmental depth map corresponding to an environment of interest, e.g., by downloading it on the system and/or uploading it on the processing system a storage medium including the environmental depth map. The environment of interest may be, e.g., a stadium, an auditorium, a field etc. where an event of interest takes place. In various embodiments the event is captured, e.g., recorded, by one or more camera devices including stereoscopic cameras and light field cameras. The static environmental depth map includes environmental measurements of the environment of interest that have been previously made, e.g., prior to the event and thus are called static. Static environmental depth maps for various famous environments of interests, e.g., known stadiums, auditoriums etc., where events occur are readily available however such environmental depth maps do not take into consideration dynamic changes to the environment that may occur during an event and/or other changes that may have occurred since the time when the environmental measurements were made. The static depth map of environment of interest may be generated using various measurement techniques, e.g., using LIDAR and/or other methods. The output from step 1405, e.g., a static depth map if available, serves as a data input to the step 1410.

In step 1410 it is checked if the static depth map is available, e.g., to the processing system. If the static depth map is available the operation proceeds from step 1410 to step 1412 otherwise the operation proceeds to step 1418. In step 1412 the processing system sets the current depth map (e.g., base environmental depth map to be used) to be the static depth map. In some embodiments when the system is initialized and depth maps from other sources are not available then the processing system initially sets the current depth map to be the static depth map if the static depth map is available. Operation proceeds from step 1412 to step 1418 with the static map (when available) being a data input to step 1418.

Prior to discussing the processing in step 1418 and the steps that follow first consider the steps of image acquisition step 1404 along the path corresponding to step 1406 since the data output as a result of steps 1406, 1414 and 1416 serves as input to step 1418. In step 1406 stereoscopic image pairs of portions of the environment of interest, e.g., left and right eye images, are captured using one or more stereoscopic camera pair(s). In some embodiments the stereoscopic camera pair(s) capturing the images are mounted on the camera rigs implemented in accordance with various embodiments discussed above. Operation proceeds from step 1406 to step 1414. In step 1414 the captured stereoscopic image pairs are received at the processing system. In various embodiments stereoscopic image pairs are processed to generate environmental depth information which provides more depth measurements of the environment for a point in time than is provided by the environmental depth information generated from images captured by said one or more light field cameras. Operation proceeds from step 1414 to step 1416. In step 1416 environmental depth information is generated from the one or more stereoscopic image pairs, e.g., with composite depth information for the environment of interest being generated. In some embodiments the composite depth information generated from the stereoscopic image pairs is in the form of an environmental depth map. In some embodiments steps 1406, 1414 and 1416 are performed at a first rate with the image capture by stereo camera pairs being performed at a selected rate. In some embodiments steps 1406, 1414 and 1416 are performed on an on-going basis at a determined rate. The output from step 1416, e.g., depth information generated from stereo images if available, serves as a data input to the step 1418.

Referring now to step 1418. In step 1418 the processing system determines if the environmental depth information generated from the one or more stereoscopic image pairs is available. For example in some cases when the stereoscopic camera pair(s) have not started capturing stereoscopic images and/or the environmental depth information map has not yet been generated, the environmental depth information based on the stereoscopic images may not be available to the processing system. If in step 1418 it is determined that environmental depth information generated from the one or more stereoscopic image pairs is available the operation proceeds from step 1418 to step 1420 otherwise the operation proceeds to step 1430.

In step 1420 it is determined if a current depth map has already been set. If it is determined that the current environmental depth map has not been set, the operation proceeds to step 1422 where the processing system sets the current environmental depth map to be the environmental depth map generated from the one or more stereoscopic image pairs. Operation proceeds from step 1422 to step 1430. If in step 1420 it is determined that the current environmental depth map has already been set, (e.g., for example the static depth map may have been set as the current environmental depth map if it was available) the operation proceeds to step 1424. In step 1424 with multiple sources of depth information being available, an environmental depth map of the environment of interest is generated from at least two different sources of depth information with the processing system reconciling the environmental depth information generated from the one or more stereoscopic image pairs (obtained in step 1416) with the depth map that has been set as the current depth map, e.g., static depth map (step 1412). Thus during initialization and/or first iteration of environmental depth map generation includes reconciling depth information from at least two different sources (when available) to generate the environmental depth map. Subsequent iterations for generating environmental depth map include updating the depth map using dynamically generated more recent depth information as part of reconciling depth information obtained from multiple sources. In some embodiments one of the depth information sources is the static depth map (also referred to as static depth model). Thus in some embodiments the environmental depth map is generated from a static depth model based on LIDAR measurements that were made when the environment was not occupied by spectators. In some embodiments the LIDAR measurements provide maximum distance information. In some embodiments the depth information obtained from stereoscopic image pairs provides depth information which includes the effect of persons, props, stage sets and/or signs present during the event but not at the time of the LIDAR measurements, e.g., which are made prior to the actual event.

Operation proceeds to step 1425. After reconciling operation completes the environmental depth map generated by reconciling depth information from two different sources is set as the current depth map as shown in step 1425. In various embodiments the reconciled environmental depth map has more and enhanced depth information compared to either one of the two individual depth maps used for reconciliation. As will be discussed in some embodiments at least two different sources of depth information includes depth information from at least two of: i) a static depth map of an environment generated prior to an event; ii) depth information obtained from stereoscopic image pairs; or iii) depth information obtained from images captured by one or more light field cameras. Operation proceeds from step 1425 to step 1430.

Prior to discussing the processing in step 1430 and the steps that follow consider first the steps along the path corresponding to step 1408 since the data output as a result of steps 1408, 1426 and 1428 serves as input to step 1430. In step 1408 images of portions of the environment of interest are captured using one or more light field cameras. In some embodiments the one or more light field cameras capturing the images are mounted on the camera rigs implemented in accordance with various embodiments discussed above. Operation proceeds from step 1408 to step 1426. In step 1426 the images captured by the light field cameras are received at the processing system optionally along with depth maps of the portions of the environment of interest. Thus in some embodiments the one or more light field cameras generate depth maps of portions of the environment from the captured images, e.g., using an on-board depth map generation unit, and provides them to the processing system. In some other embodiments the actual images captured by the light field cameras are provided and the processing system generates depth maps of portions of the environment of interest. Operation proceeds from step 1426 to step 1428. In step 1428 environmental depth information is generated from the one or more received images captured by the light field cameras and/or from the depth maps of portions of the environment of interest, e.g., with composite depth information generated from light field camera images being in the form of an environmental depth map of the environment of interest. In some embodiments steps 1408, 1426 and 1428 are performed at a second rate with the image capture by light field camera(s) being performed at a selected rate. In some embodiments steps 1408, 1426 and 1428 are performed on an on-going basis at a determined rate. In some embodiments the rate at which the images are captured by the light field camera(s) is different than the rate at which images are captured by the stereo camera pairs. In some embodiments the depth information obtained from the stereoscopic images is of higher resolution in terms of the number of spatial locations to which the measurements correspond but has a lower accuracy than the depth information obtained from the images captured by the one or more light field cameras. Operation proceeds from step 1428 to step 1430.

Now returning to step 1430. In step 1430 the processing system determines if the environmental depth information, generated from the image captured by the light field cameras or from the depth information of one or more portions of the environment of interest, is available to the processing system. If in step 1430 it is determined that such environmental depth information is available the operation proceeds from step 1430 to step 1432 otherwise the operation proceeds to step 1442 via connecting node B 1440.

In step 1432 it is determined if a current depth map has already been set. If it is determined that the current depth map has not been set, e.g., indicating that the environmental depth information from other sources was not available to the processing system and thus not set, the operation proceeds from step 1432 to step 1434 where the processing system sets the current depth map to be an environmental depth map generated from the one or more images captured by the light field cameras and/or from the depth information corresponding to portions of the environment of interest. Operation proceeds from step 1434 to step 1446 via connecting node A 1438. If in step 1432 it is determined that the current depth map has already been set, (e.g., for example the static depth and/or environmental depth map generated from stereoscopic images and/or reconciled depth map when available may have been set as the current depth map) the operation proceeds to step 1436 where the processing system updates the existing current map by reconciling, e.g., combining, environmental depth information generated in step 1428 from the one or more images captured by the light field cameras with the current environmental depth map information. It should be appreciated that at this stage the input current depth map may be the depth map generated from stereoscopic images (step 1422) or the depth map generated by reconciling (1424) the depth information obtained from the stereoscopic images with the static depth map or the reconciliation may involve reconciling the static depth map with the depth information obtained form a light field camera. Thus the reconciling operation in step 1436 may include reconciling, e.g., combing, depth information obtained from images captured using one or more light filed cameras with depth information generated from images captured by LIDAR, and/or stereo cameras.

Generally the light field depth information maybe more accurate than stereoscopic depth information particularly where processing time is limited such as in real time updating of the depth map while an event is ongoing. Accordingly, when combining light field depth information with stereo depth information the light field depth information maybe treated as more reliable in some embodiments and weighted more heavily than stereoscopic determined depth information when both sources of information are available for the same location.

In some embodiments reconciling depth information generated from images captured by the one or more light field cameras and depth information obtained from stereoscopic images as performed in step 1436 includes using the depth information obtained from stereoscopic images to determine depths for environmental points which are located between environmental points for which light field camera provided depth information is available. In such a case, the stereo provided depth information maybe and sometimes is used to provide information about the change in depth between environmental locations for which the depth is known or measured using another measurement technique, e.g., a light field based depth measurement technique.

In some embodiments the maximum depth is determined using LIDAR or other measurements when the event area is empty with the stereoscopic depth information being used to determine how the environment changes while in use. Stereoscopic depth information maybe and sometimes is obtained at a relatively fast rate, e.g., at a frame rate allowing for relatively rapid refinement of depth models and surfaces. While the light field camera or cameras may capture depth information at a lower rate and/or lower resolution. Thus while the light field cameras may provide accurate information for a number of locations, the stereoscopic depth information may provide measurements for a larger number of locations in the environment, e.g., a depth estimate for each pixel of a captured image in some embodiments.

Operation proceeds from step 1436 to step 1437. After reconciling operation completes the reconciled environmental depth map generated from reconciled depth information from multiple sources is set as the current depth map as shown in step 1437. Operation proceeds from step 1437 to step 1446 via connecting node A 1438.

If in step 1430 it is determined that environmental depth information is not available the operation proceeds from step 1430 to step 1442 via connecting node B 1440. In step 1442 it is determined if a current depth map has already been set. If it is determined that the current depth map has not been set, the operation proceeds from step 1442 to step 1444 where the processing system sets the current depth map to a default depth map corresponding to a sphere since no other environmental depth map and/or depth information which can be used to generate the environmental depth map is available to the processing system. Operation proceeds from step 1444 to step 1446.

In step 1442 if it is determined if a current depth map has already been set (e.g., set to one of the reconciled environmental depth maps or the static depth map) the operation proceeds from step 1442 to step 1446.

Returning to step 1446. In step 1446 the processing system outputs the current environmental depth map, e.g., communicate to a playback device. Outputting the current environmental depth map may include outputting to a display device, outputting to an external storage device and/or transmitting, e.g., via a transmitter, to one or more customer devices. The current environmental depth map may be, and in various embodiments is, provided, e.g., transmitted, to one or more customer rendering and playback devices, e.g., for use in displaying 3D imaging content. The environmental depth map may be generated and/or updated multiple times during an event, e.g., a game and/or other performance, as things may change dynamically during the event which may impact the environment of interest and thus updating the environmental depth map to keep it current is useful if the system is to be provide information and imaging content which can be used to provide a real life 3D experience to the viewers. In some embodiments the environmental depth map is in the form of a 3D model of the environment in which images are captured. In various embodiments such a 3D model is used by rendering and playback devices in rendering 3D image content. It should be appreciated that method discussed with regard to flowchart 1400 allows for generating an enhanced and improved environmental depth map based on depth information from multiple sources, e.g., static depth maps, depth maps generated using images captured by one or more stereoscopic camera pairs and/or depth maps generated using images captured by one or more light field cameras.

Operation proceeds from step 1446 to step 1447 in which an image captured in the environment of interest to which the generated current depth map corresponds is displayed by wrapping the image onto the 3D model produced from the depth measurements. In some embodiments the image is displayed on a display device which may be part of the processing system. The image wrapped onto the 3D model may be displayed to an operator of the processing system. In some other embodiments the image display operation may be performed on a display device associated with a customer rendering and playback device.

Following outputting of the current environmental depth map the operation also proceeds from step 1446 to step

1448. In step 1448 the processing system initializes a new variable last output environmental depth map by setting it to the current environmental depth map (which has been output in step 1446). As discussed in detail below the value and/or status of last output environmental depth map is used in determining whether there have been significant changes and/or updates to the depth map which may require transmission of an updated current depth map to customer devices. Operation proceeds from step 1448 to step 1450. In step 1450 it is determined whether any new depth information generated from additional and/or newly captured stereoscopic images is available (recall that the stereoscopic image capture and generation of depth information from stereoscopic images (steps 1406, 1414, 1416) is ongoing during the event). Thus the processing system monitors to detect if additional/new depth information is available from the stereoscopic images. If it is determined that additional/new depth information is available from captured stereoscopic images the operation proceeds from step 1450 to step 1452 else the operation proceeds from step 1450 to step 1460.

In step 1452 the recently generated depth information generated from stereoscopic images is reconciled with current depth map to update the current environmental depth map based on the more recent depth information generated from stereoscopic images captured during the event. Thus additional depth information generated from new additional stereo image pairs captured during the event facilitates updating the environmental depth map by reconciling the current map with recent depth information generated form stereoscopic images. Operation proceeds from step 1452 to step 1454. In step 1454 the updated depth map is set to be the current depth map. Operation proceeds from step 1454 to step 1456. Operation also proceeds to step 1460 with the updated depth map (when available) being a data input to steps 1456 and 1460.

In step 1456 the system determines the difference between the current depth map (the updated depth map is set to current environmental depth map in step 1454) and the last output depth map, e.g., to check if there have been significant changes in depth information. Operation proceeds from step 1456 to step 1458 where it is determined if the difference in depth information between the current (e.g., updated) depth map and the last output depth map is significant. In some embodiments any change maybe considered significant. In other embodiments a change in depth in a particular area of the environment, e.g., the stage is considered significant but a change in another area of the environment, e.g., a rear area behind the camera position is not considered significant unless the change is beyond some predetermined or dynamically determined amount.

Thus, in some embodiments whether a change in depth is significant is dependent not only on the location of the detected change in depth in the environment but also the amount of change. Thus determining whether a change in depth is significant in step 1458 can and sometimes does involve determining whether the location of the change in depth corresponds to a high priority area or area deemed significant and/or determining if the amount of change in detected depth is above a threshold amount used to determine if the change is significant where, in some but not all embodiments the threshold is dependent on the location, e.g., front, rear, side area with respect to the camera position to which the depth map corresponds.

If it is determined that the difference in depth information is not significant, e.g., not important enough to merit communication or use of the new depth map information to a playback device, operation proceeds back to step 1450 and continues as new additional depth information from additional captured stereo images becomes available. However if in step 1458 it is determined that the difference in depth information is significant, operation proceeds from step 1458 to step 1466 wherein the current updated environmental depth map reflecting the changes in the environment which were detected is communicated, e.g., transmitted, to a server, processing device and/or playback device.

Returning to step 1450. If in step 1450 it is determined that additional/new depth information is not available from captured stereoscopic images the operation proceeds from step 1450 to step 1460. In step 1460 it is determined if additional/new depth information generated from additional and/or new images captured by light field cameras is available (recall that the light field camera image capture and generation of depth information from light field camera captured images (steps 1408, 1426, 1428) is ongoing during the event). Thus the processing system monitors to detect if additional/new depth information is available from the field camera captured images. If it is determined that additional/new depth information is available from field camera captured images the operation proceeds from step 1460 to step 1462 else the operation proceeds from step 1460 back to step 1450.

In step 1462 the depth information generated from light field camera images is reconciled with current depth map to update the current environmental depth map based on the more recent depth information generated from light field camera images captured during the event. As should be appreciated such an update may occur while an event is ongoing, e.g., a show is being performed. Thus additional depth information generated from new additional light field camera images captured during the event facilitates updating the environmental depth map by reconciling the current map with recent depth information. In this way changes in the stage, props and/or locations of individuals can be reflected in the depth map in real or near real time. Operation proceeds from step 1462 to step 1464. In step 1464 the updated depth map is set to be the current depth map. Operation proceeds from step 1464 to step 1456 and the operations discussed with regard to steps 1456 and 1458 are performed with the current depth map being the updated environmental depth map generated in step 1462 by reconciling new depth information generated from light field camera captured images. Again if the different between the current (updated) environmental depth map and the last output depth map is not significant the operation proceeds back to step 1450 and continues if new additional depth information becomes available. If it is determined that the difference in depth information is significant, operation proceeds from step 1458 to step 1466.

In step 1466 the system transmits depth map difference information or the actual current environmental depth map to one or more customer rendering and playback devices and/or other systems such as a server or image processing system.

Depth map difference information maybe and sometimes are transmitted where changes in the depth map are relatively small thereby avoiding the need to retransmit the full depth map to a device having an earlier, e.g., previously communicated, depth map of the environment.

In some embodiments the system transmits the depth map difference information indicating the difference in depth information between the current, e.g., updated, depth map and the last output environmental depth map. Using the difference information the receiving customer rendering and playback devices can update their environmental depth map in use. As should be appreciated sending simply the difference information is much bandwidth efficient and less wasteful compared to transmitting of an entire depth map since relatively little information is being transmitted. In some other embodiments the entire updated environmental depth map is transmitted. Operation proceeds from step 1466 back to step 1448 as indicated by the loop back.

Figure 13:
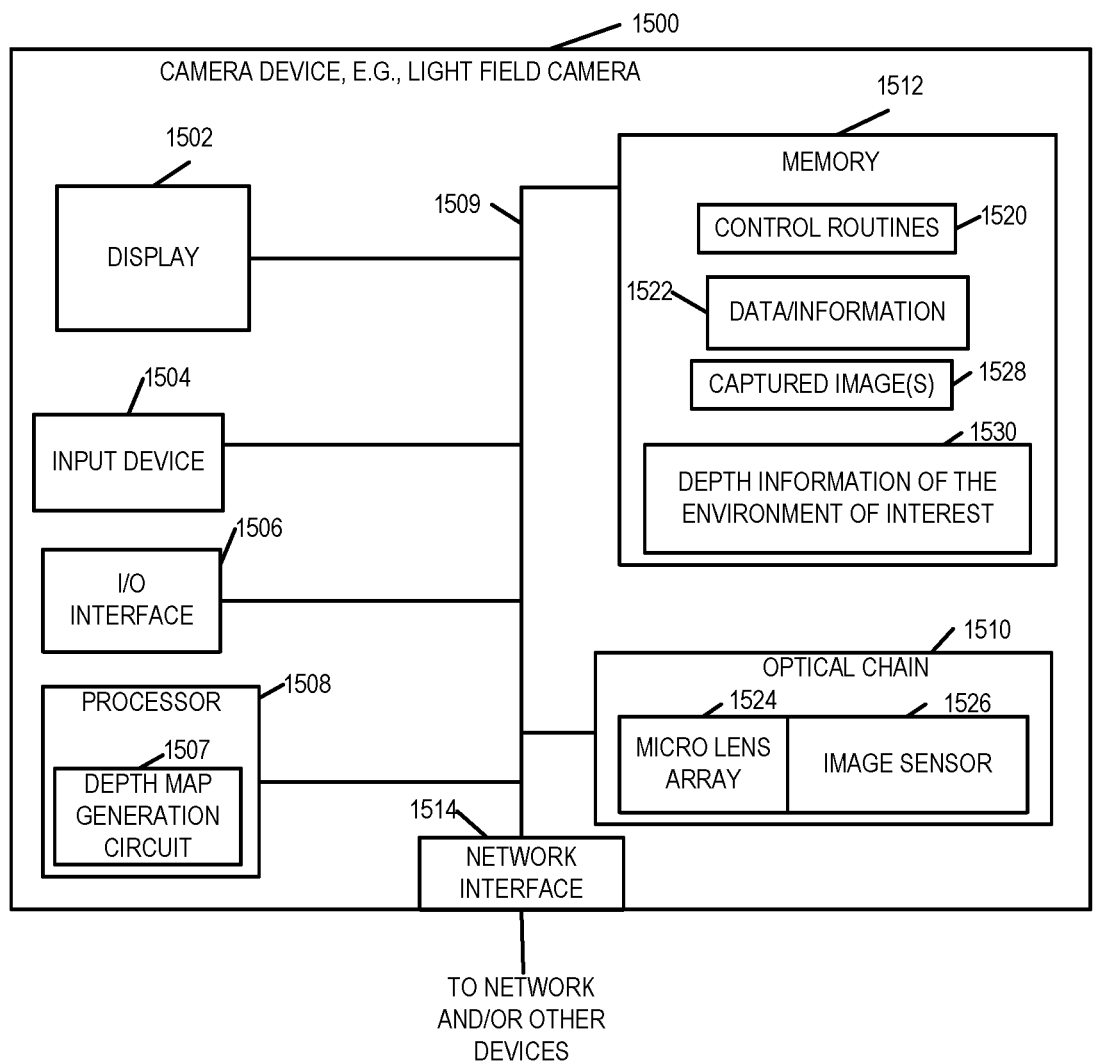
FIG. 13 illustrates an exemplary light field camera which can be used in the camera rig shown in FIGS. 1-9.

FIG. 13 illustrates an exemplary light field camera 1500 implemented in accordance with one exemplary embodiment of the present invention which can be used in the camera rigs shown in the preceding figures which have been discussed above. The exemplary camera device 1500 includes a display device 1502, an input device 1504, an I/O interface 1506, a processor 1508, memory 1510, and a bus 1509 which are mounted in a housing represented by the rectangular box touched by the line leading to reference number 1500. The camera device 1500 further includes an optical chain 1512 and a network interface 1514. The various components are coupled together via bus 1509 which allows for signals and information to be communicated between the components of the camera 1500.

The display device 1502 may be, and in some embodiments is, a touch screen, used to display images, video, information regarding the configuration of the camera device, and/or status of data processing being performed on the camera device. In the case where the display device 1502 is a touch screen, the display device 1502 serves as an additional input device and/or as an alternative to the separate input device, e.g., buttons, 1504. The input device 1504 may be, and in some embodiments is, e.g., keypad, touch screen, or similar device that may be used for inputting information, data and/or instructions.

Via the I/O interface 1506 the camera device 1500 may be coupled to external devices and exchange information and signaling with such external devices. In some embodiments via the I/O interface 1506 the camera 1500 may, and in some embodiments does, interfaces with the processing system 1600. In some such embodiments the processing system 1600 can be used to configure and/or control the camera 1500.

The network interface 1514 allows the camera device 1500 to be able to receive and/or communicate information to an external device over a communications network. In some embodiments via the network interface 1514 the camera 1500 communicates captured images and/or generated depth maps to other devices and/or systems over a communications network, e.g., internet and/or other network.

The optical chain 1510 includes a micro lens array 1524 and an image sensor 1526. The camera 1500 uses the micro lens array 1524 to capture light information of a scene of interest coming from more than one direction when an image capture operation is performed by the camera 1500.

The memory 1512 includes various modules and routines, which when executed by the processor 1508 control the operation of the camera 1500 in accordance with the invention. The memory 1512 includes control routines 1520 and data/information 1522. The processor 1508, e.g., a CPU, executes control routines and uses data/information 1522 to control the camera 1500 to operate in accordance with the invention and implement one or more steps of the method of flowchart 1400. In some embodiments the processor 1508 includes an on-chip depth map generation circuit 1507 which generates depth information for various portions of the environment of interest from captured images corresponding to these portions of the environment of interest which are captured during the operation of the camera 1500 in accordance with the invention. In some other embodiments the camera 1500 provides captured images 1528 to the processing system 1600 which generates depth information using the images captured by the light field camera 1500. The depth information of various portions of the environment of interest generated by the camera 1500 is stored in the memory 1512 as depth information 1530 while images corresponding to one or more portions of the environment of interest are stored as captured image(s) 1528. The depth information 1530 of various portions of the environment constitutes the depth map of the environment. The captured images and depth maps are stored in memory 1512 for future use, e.g., additional processing, and/or transmission to another device. In various embodiments the depth information 1530 generated by the camera 1500 and one or more captured images 1528 of portions of the environment of interest captured by the camera 1500 are provided to a processing system, e.g., via interface 1506 and/or 1514, for further processing and actions in accordance with the features of the invention. In some embodiments the depth information and/or captured images are provided, e.g., communicated by the camera 1500, to one or more customer devices.

Figure 14:
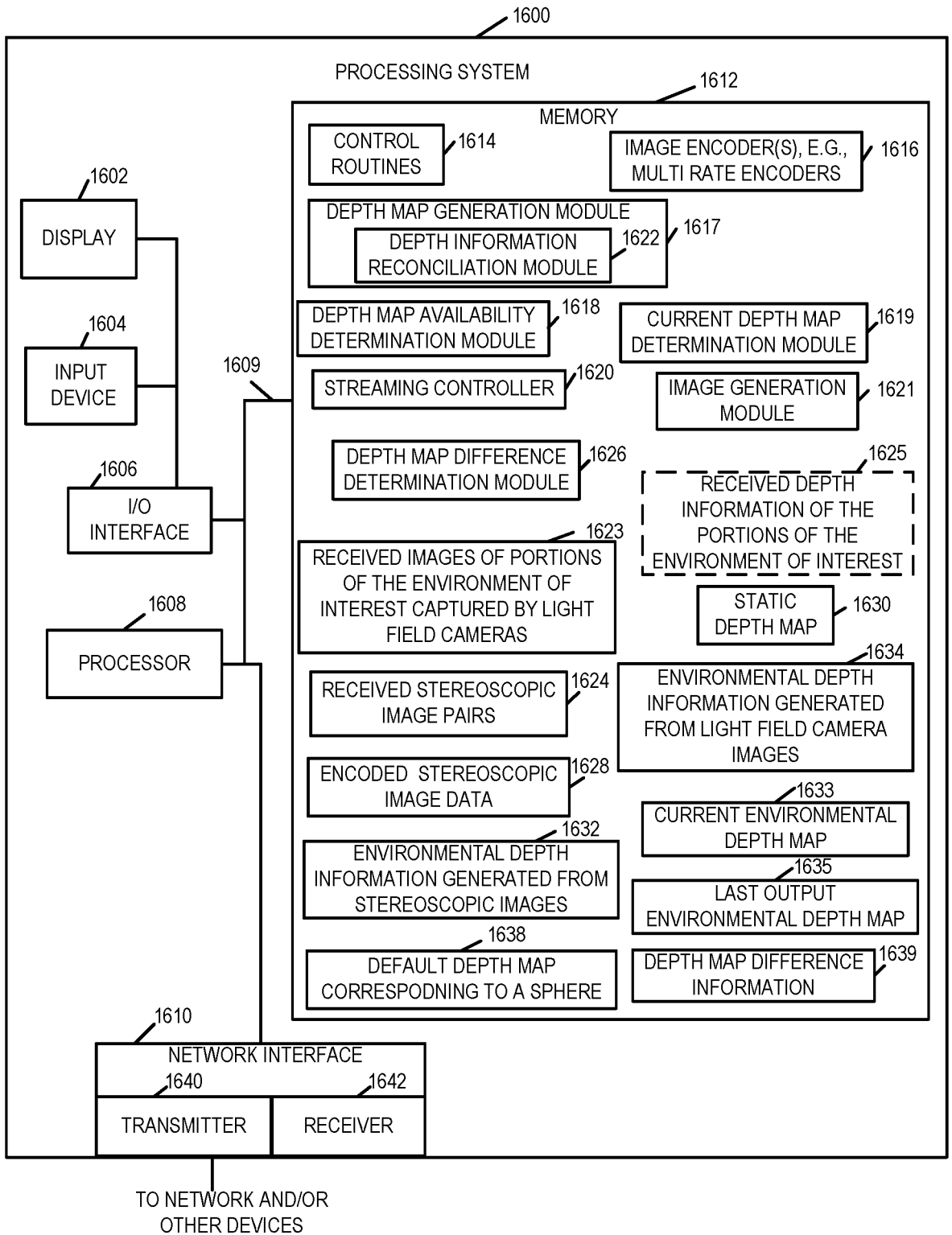
FIG. 14 illustrates an exemplary processing system implemented in accordance with the invention.

FIG. 14 illustrates an exemplary processing system 1600 in accordance with the features of the invention. The processing system 1600 can be used to implement one or more steps of the method of flowchart 1400 of FIG. 12. The processing system 1600 includes multi-rate encoding capability that can be used to encode and stream stereoscopic imaging content.

The processing system 1600 may be, and in some embodiments is, used to perform individual depth map and/or composite environmental depth map generation operation, encoding operation, storage, and transmission and/or content output operations in accordance with the features of the invention. The processing system 1600 may also include the ability to decode and display processed and/or encoded image data, e.g., to an operator.

The system 1600 includes a display 1602, input device 1604, input/output (I/O) interface 1606, a processor 1608, network interface 1610 and a memory 1612. The various components of the system 1600 are coupled together via bus 1609 which allows for data to be communicated between the components of the system 1600.

The memory 1612 includes various routines and modules which when executed by the processor 1608 control the system 1600 to implement the composite environmental depth map generation, environmental depth map reconciling, encoding, storage, and streaming/transmission and/or output operations in accordance with the invention.

The display device 1602 may be, and in some embodiments is, a touch screen, used to display images, video, information regarding the configuration of the processing system 1600, and/or indicate status of the processing being performed on the processing device. In the case where the display device 1602 is a touch screen, the display device 1602 serves as an additional input device and/or as an alternative to the separate input device, e.g., buttons, 1604. The input device 1604 may be, and in some embodiments is, e.g., keypad, touch screen, or similar device that may be used for inputting information, data and/or instructions.

Via the I/O interface 1606 the processing system 1600 may be coupled to external devices and exchange information and signaling with such external devices, e.g., such as the camera rig 801 and/or light field camera 1500 and/or the camera rigs shown in any of the other figures which may include both stereoscopic cameras and light field cameras. The I/O interface 1606 includes a transmitter and a receiver. In some embodiments via the I/O interface 1606 the processing system 1600 receives images captured by various cameras, e.g., stereoscopic camera pairs and/or light field cameras (e.g., camera 1500), which may be part of a camera rig such as camera rig 801.

The network interface 1610 allows the processing system 1600 to receive and/or communicate information to an external device over a communications network, e.g., internet and/or other communications network. The network interface 1610 in some embodiments includes a transmitter 1640 and a receiver 1642. In some embodiments via the transmitter 1640 the processing system 1600 broadcasts multiple encoded stereoscopic data streams each supporting different bit rates to various customer devices. In some embodiments the processing system 1600 transmits different portions of a scene, e.g., 180 degree front portion, left rear portion, right rear portion etc., to customer devices via the multiport broadcast transmitter 1640. Furthermore, in some embodiments via the transmitter 1640 the processing system 1600 broadcasts a current environmental depth map to the one or more customer devices. While the transmitter 1640 is used in some embodiments to broadcast content stream and/or environmental depth map, still in some other embodiments the transmitter 1640 transmits, e.g., unicasts, the composite environmental depth map and/or imaging content to individual customer devices. Thus in some embodiments the processor 1608 is configured to control the processing system 1600 to output, e.g., transmit via the transmitter 1640, a current environmental depth map to one or more customer rendering and playback devices. In some embodiments the processor 1608 is configured to control the processing system 1600 to output, e.g., transmit via the transmitter 1640, difference depth information indicating the difference in depth information between a currently generated environmental depth, e.g., updated depth map, and the last output environmental depth map, to one or more customer rendering and playback devices.

The memory 1612 includes various modules and routines, which when executed by the processor 1608 control the operation of the system 1600 in accordance with the invention. The processor 1608, e.g., a CPU, executes control routines and uses data/information stored in memory 1612 to control the system 1600 to operate in accordance with the invention and implement one or more steps of the method of flowchart 1400. The memory 1612 includes control routines 1614, image encoder(s) 1616, a depth map generation module 1617, a depth map availability determination module 1618, a current depth map determination module 1619, streaming controller 1620, an image generation module 1621, a depth map difference determination module 1626, received images 1623 of environment of interest captured by one or more light field cameras, optional received depth maps of the environment of interest 1625, received stereoscopic image data 1624, encoded stereoscopic image data 1628, acquired static depth map 1630, environmental depth information generated from stereoscopic image pairs 1632, environmental depth information generated from images captured by one or more light field cameras 1634, and a default depth map corresponding to a sphere 1638.

In some embodiments the modules are, implemented as software modules. In other embodiments the modules are implemented outside the memory 1612 in hardware, e.g., as individual circuits with each module being implemented as a circuit for performing the function to which the module corresponds. In still other embodiments the modules are implemented using a combination of software and hardware. In the embodiments where one or more modules are implemented as software modules or routines, the modules and/or routines are executed by the processor 1608 to control the system 1600 to operate in accordance with the invention and implement one or more operations discussed with regard to flowchart 1400.

The control routines 1614 include device control routines and communications routines to control the operation of the processing system 1600. The encoder(s) 1616 may, and in some embodiments do, include a plurality of encoders configured to encode received image content, stereoscopic images of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 1616 is the encoded stereoscopic image data 1628 stored in the memory for streaming to customer devices, e.g., playback devices. The encoded content can be streamed to one or multiple different devices, e.g., such as customer rendering and playback devices, via the network interface 1610. The encoder(s) 1616 in some embodiments are implemented in hardware.

The depth map generation module 1617 (in some embodiments implemented as a depth map generator 1617) is configured to generate a composite environmental depth maps of the environment of interest from at least two different sources (e.g., when available) of depth information. As discussed above a plurality of different sources of depth information providing depth measurements of an environment of interest may and sometimes are available. In various embodiments the depth map generation module 1617 is configured to combine depth information from the at least two different sources of depth information including: i) depth information obtained from said static map, ii) depth information obtained from images captured by said light field camera, and iii) depth information obtained from images captured by said stereoscopic pair of cameras, as part of generating the environmental depth map. In some embodiments processing system 1600 uses the images captured by various cameras, e.g., stereoscopic camera pairs and one or more light field cameras to generate depth information from each individual depth information source prior to generating a composite environmental depth map. Thus in some embodiments the depth map generation module 1617 is configured to generate depth information from the images captured by various cameras, e.g., stereoscopic camera pairs and one or more light field cameras. In some embodiments the depth map generation module 1617 generates depth information from one or more stereoscopic image pairs 1624 and generates depth information from images 1623 of the environment captured by light field cameras received by the processing system 1600. In some embodiments in addition or as an alternative to the light field camera images 1623 the depth map generation module 1617 receives depth information 1625 corresponding to various portions of the environment generated by the light field cameras from images captured by light field cameras. Thus in some embodiments depth information of the environment of interest from a plurality of sources is aggregated prior to the depth map generation module 1617 generating a combined depth map.

In some embodiments the depth map generation module 1617 includes the depth information reconciliation module 1622 configured to reconcile depth information 1632 generated from images captured by the stereoscopic cameras and/or depth information 1634 generated from images captured by the light field cameras during the event with a current environment depth map at the given time, as part of combining depth information from at least two different sources of depth information to generate the environmental depth map. It should be appreciated that the depth information 1632 generated from images captured by the stereoscopic cameras forms the depth map generated from stereoscopic images and the depth information 1634 generated from light field camera images forms the depth map generated from light field camera images. In some embodiments the processing system 1600 sets the most recently generated depth map as the current depth map. In some embodiments during initialization, e.g., when depth information from stereo and/or light field cameras is not yet available, a static depth map generated from LIDAR measurements may be set as the current depth map if it is available. In some embodiments the depth information reconciliation module 1622 is configured to reconcile depth information 1634 generated from images captured by the light field camera with depth information 1632 generated from the stereoscopic images captured by the stereoscopic pair of cameras, as part of being configured to combine depth information from the at least two different sources of depth information to generate the environmental depth map. In some embodiments the depth information reconciliation module 1622 is further configured to use the depth information 1632 obtained from stereoscopic images to determine depths for environmental points which are located between environmental points for which depth information obtained from an image captured by the light field camera is available, as part of being configured to reconcile depth information generated from images captured by the light field camera and depth information obtained from stereoscopic images. In various embodiments as new/additional depth information becomes available, e.g., obtained from new/additional images captured by the light field cameras and/or stereoscopic cameras, the depth map generation module 1617 generates updated environmental depth map using the new available depth information. In some embodiments the depth map generation module 1617 is further configured to update the generated environmental depth map based on depth information obtained from the processing of images captured by said light field camera while the event is ongoing. In some embodiments the depth map generation module 1617 is further configured to update the environmental depth map based on depth information generated from images captured by said stereoscopic pair of cameras during the event. Thus the depth map reconciliation module 1622 is configured to perform depth map reconciling operations in accordance with the invention, e.g., by performing the reconciling operations discussed in the corresponding steps of flowchart 1400. The environmental depth map 1632 is an output of the depth map generation module 1617

The static depth map 1630 in some embodiments is a static model generated based on depth measurements using LIDAR that were made when the environment was not occupied by spectators. Such a static depth map when available for a given environment of interest may be provided to the processing system 1600 for use in generating an enhanced composite environmental depth map, e.g., 3D model, in accordance with the invention.

The depth map availability determination module 1618 is configured to determine whether a depth map or depth information from a given source is available at a given time, e.g., whether a static depth map is available and/or whether environmental depth information generated from images captured by light field cameras is available and/or whether environmental depth information generated from images captured by stereoscopic camera pairs is available.

The current depth map determination module 1619 is configured to determine if a current depth map has been set by the processing system at a given time. In various embodiments depending on the availability of depth information from various different sources and the timing of determination the current depth map determination module 1619 is further configured to set an environmental depth map as the current environmental depth map to be used and/or output in accordance with the features of the invention as discussed in detail with regard to steps 1412, 1422, 1425, 1434, 1437, 1444, 1454 and 1464.

The streaming controller 1620 is configured to control streaming of encoded content for delivering the encoded image content (e.g., at least a portion of encoded stereoscopic image data 1628) to one or more customer playback devices, e.g., over a communications network. In various embodiments the streaming controller 1620 is further configured to communicate, e.g., transmit via the transmitter 1640, an environmental depth map that has been set as the current depth map to one or more customer playback devices, e.g., via the network interface 1610. In some embodiments after a base environmental map has been communicated to customer playback devices, rather than frequently sending updated environmental depth maps the processor 1608 controls the processing system to transmit, e.g., via the transmitter 1640, depth map difference information to customer playback devices.

The image generation module 1621 is configured to generate a first image from at least one image captured by the light field camera, e.g., received images 1623, the generated first image including a portion of the environment of interest which is not included in at least some of the stereoscopic images (e.g., stereoscopic image content 1624) captured by the stereoscopic cameras. In some embodiments the streaming controller 1620 is further configured to transmit at least a portion of the generated first image to one or more customer playback devices, e.g., via the network interface 1610.

In some embodiments the environmental depth map is used to form a 3D model of the environment in which images are captured. In some embodiments the image generation module 1621 is further configured to wrap an image captured in the environment of interest onto the 3D model. In some embodiments the processing system displays, e.g., over the display device 1602, the image wrapped onto the 3D model. Thus in some embodiments one or more images, e.g., corresponding to a scene, captured in the environment of interest in which the depth measurements are performed and to which the generated environmental depth map corresponds, are wrapped onto the 3D environmental model produced from the depth measurements and displayed, e.g., to an operator or administrator of processing system 1600.

The depth map difference determination module 1626 is configured to determine a difference between a current environmental depth map 1633 (the depth map set as the current environmental depth map) and the last output environmental depth map 1635 (the last depth map that had been output). The depth map difference determination module 1626 is further configured to determine if the difference in depth information between the current depth map (e.g., an updated current depth map) and the last output depth map is significant. The depth map difference information 1639 is an output of the depth map difference determination module 1626. In some embodiments the depth map difference information 1639 is communicated to the customer devices rather than sending an entire current (e.g., updated) environmental depth map.

Received stereoscopic image data 1624 includes stereoscopic image pairs captured by received from one or more stereoscopic cameras, e.g., such as those included in the rig 801. Encoded stereoscopic image data 1628 includes a plurality of sets of stereoscopic image data which have been encoded by the encoder(s) 1616 to support multiple different bit rate streams.

The static depth map 1630 is the acquired, e.g., downloaded, depth map of the environment of interest. The environmental depth map generated from images captured by stereoscopic camera pairs 1632 and the environmental depth map generated from images captured by one or more light field cameras 1634 are generated by the environmental depth map generation module 1617 in some embodiments using the received captured images 1623 and 1624. The default depth map corresponding to a sphere 1638 is also stored in memory 1612 for use in the even when no an environmental depth map is not available from other sources, e.g., when none of the static depth map 1630, environmental depth map 1632 and environmental depth map 1634 is available for use. The current environmental depth map 1633 is the depth map of the environment generated by the depth map generation module (depth map generator) 1617 in accordance with the features of the present invention.

In some embodiments various modules shown in FIGS. 13 and 14 are implemented fully in hardware within the processors 1508 and 1608, e.g., as individual circuits. In other embodiments some of the modules are implemented, e.g., as circuits, within the processors 1508, 1608 with other modules being implemented, e.g., as circuits, external to and coupled to the processors 1508, 1608. Alternatively, in some other embodiments rather than being implemented as circuits, all or some of the modules may be implemented in software and stored in the memory of the devices 1500 and 1600 with the modules in the respective devices controlling the operation of the corresponding device 1500, 1600 to implement the functions corresponding to the modules when the modules are executed by the corresponding processor in the device, e.g., processor 1506 or 1608.

In still other embodiments, various modules are implemented as a combination of hardware and software, e.g., with a circuit external to the processor 1508, 1608 providing input to the processor 1508, 1608 which then under software control operates to perform a portion of a module's function.

While shown in each of the FIGS. 13 and 14 embodiments as a single processor 1508, 1608, e.g., computer, within the respective devices 1500, 1600, it should be appreciated that processor 1508 and processor 1608 may be implemented as one or more processors, e.g., computers. When implemented in software, the modules include code, which when executed by the processors 1508, 1608 configure the processor, e.g., computer, to implement the function corresponding to the module. In some embodiments, processors 1508, 1608 are configured to implement each of the modules in the corresponding device. Completely hardware based or completely software based modules may be used in the devices 1500 and 1600. However, it should be appreciated that any combination of software and hardware (e.g., circuit implemented) modules may be used to implement the functions. As should be appreciated, the modules shown in FIGS. 13-14 control and/or configure the respective devices 1500 and 1600 or elements therein such as the processors 1508, 1608 to perform various operation in accordance with the invention.

An exemplary method of operating an imaging system, comprises: generating an environmental depth map of an environment of interest from at least two different sources of depth information; and outputting said generated environmental depth map. In various embodiments the at least two different sources of depth information include depth information from at least two of: i) a static depth map of an environment generated prior to an event; ii) depth information obtained from stereoscopic image pairs; or iii) depth information obtained from images captured by one or more light field cameras.

In some embodiments the method further comprises: updating the environmental depth map based on depth information obtained from the processing of images captured by said one or more light field cameras while the event is ongoing. In some embodiments the method further comprises: updating the environmental depth map based on depth information generated from stereoscopic images captured by a pair of cameras used to capture a stereoscopic image pair during the event.

In some embodiments the stereoscopic image pair is processed to generate environmental depth information which provides more depth measurements of the environment for a point in time than is provided by the environmental depth information generated from images captured by said one or more light field cameras. In some embodiments the environmental depth map is generated from a static depth model based on LIDAR measurements that were made when the environment was not occupied by spectators. In some embodiments LIDAR measurements provide maximum distance information. In some embodiments the depth information obtained from stereoscopic image pairs provides depth information which includes the effect of persons, props, stage sets and/or signs present during the event but not at the time of said LIDAR measurements. In some embodiments the depth map information obtained from images captured by the light field cameras provides more accurate depth information than the depth information obtained from the images captured by the stereoscopic pair.

In some embodiments where the LIDAR measurements of one or more depths are used to determine a maximum depth in the environment and to calibrate or scale depth measurements obtained from non-LIDAR measurement techniques. For example, for a given location the LIDAR depth maybe compared to a depth for the same location determined by light field measurement techniques and/or stereo measurement techniques. If the light field measurement of the depth is larger than the LIDAR depth measurement, the difference in measurements maybe, and sometimes are reconciled by scaling the light field measured depth by an amount required to match the LIDAR measured depth at the same location. For example, if the LIDAR measure depth was a first distance D1, and D1 is less than the light field based measured depth D2, the light field measured depths maybe scaled by the factor D2/D1 to reconcile the light field measurements with the highly accurate LIDAR measurements. Stereo depth measurements maybe reconciled with Lidar and/or light field measurements in the same manner. Such a determination of a scaling factor is particularly useful for locations in the environment where the outermost distances are fixed, e.g., because they correspond to walls or other fixed structures, and the light field or stereoscopic measurement overestimate the distance in the area for which the LIDAR measurement is available.

When the light field or stereo depth measurements are less than the LIDAR measurement for a given location, the shorter depth maybe due to an object being added into the environment or some sort of light field or stereo depth measurement error. In such cases, reconciliation may involve determining whether the light field and/or stereo depth measurements show a consistent discrepancy with regard to multiple different locations of the environment as compared to the LIDAR measurements in which case a scaling factor maybe determined to compensate for the systematic non-LIDAR measurement errors so that the depth measurements can be combined in a reliable manner.

When the light field and/or stereoscopic cameras show a short term change in depth to a shorter depth as measured from the camera position, it maybe assumed that the change in depth is due to an object being placed into or moved in the environment but in the case of extremely short term changes, e.g., corresponding to a frame time, such changes in depth maybe due to extremely transient conditions or measurement errors.

In some embodiments to avoid altering a depth map that is intended to be used for multiple frame time periods, e.g., corresponding to one or more groups of pictures, reconciling of different depth measurements considers not only the source of the depth measurement but whether the measurement indicates a change to a depth less than a previously measured depth and/or the duration of the change in depth measurement. For example stereoscopic depth measurement maybe averaged over multiple frame time periods, e.g., over a time period corresponding to a number of frames captured in seconds or minutes and/or the number of frames including in a video coding unit such as a group of pictures. Consideration of the amount of time for which a change in depth is detected is taken into consideration to avoid introducing depth measurement changes into the depth map used for rendering images which are highly transient in nature or due to short term measurement errors.

In some embodiments updating the environmental depth map is based on depth information captured by stereoscopic image pairs by a pair of stereo cameras, and/or multiple images from different cameras that may not from a stereo camera pair but which have a known relationship from which depth information can be determined. The updating of a depth map is performed in some embodiments as part of reconciling depth information generated from images captured by the one or more light field cameras with depth information generated from the stereoscopic images captured by a stereoscopic camera pair.

In some embodiments the depth information obtained from the stereoscopic images is of higher resolution in terms of the number of spatial locations to which measurements correspond but have a lower accuracy than the depth information obtained from the images captured by the one or more light field cameras. Thus more data points, e.g., depth measurement for different environmental locations, maybe obtained from stereoscopic image information than from the light field cameras in some embodiments. In some embodiments the reconciling depth information generated from images captured by the one or more light field cameras and depth information obtained from stereoscopic images includes using the depth information obtained from stereoscopic images to determine depths for environmental points which are located between environmental points for which light field camera provided depth information is available.

In some embodiments the environmental depth map is in the form of a 3D model of the environment in which images are captured. In some embodiments the method further comprises: displaying an image captured in the environment of interest to which said environmental depth map corresponds by wrapping the image onto the 3D model produced from the depth measurements.

An exemplary imaging system implemented in accordance with some embodiments comprises: a processor configured to: generate an environmental depth map of an environment of interest from at least two different sources of depth information, and output said generated environmental depth map. In some embodiments the system further comprises: an interface configured to receive a static map of the environment; a light field camera configured to capture images of the environment, and a stereoscopic pair of cameras for capturing pairs of images of the environment. In various embodiments the images captured by the light field camera and the stereoscopic pair of cameras are used to generate and provide depth information of the environment in which the images are captured.

In some embodiments the processor is configured, as part of being configured to generate the environmental depth map, to combine depth information from said at least two different sources of depth information including: i) depth information obtained from said static map, ii) depth information obtained from images captured by said light field camera, and iii) depth information obtained from images captured by said stereoscopic pair of cameras.

In some embodiments the processor is configured to: update the environmental depth map based on depth information obtained from the processing of images captured by said light field camera while the event, e.g., show, concert, race, sports game, etc., is ongoing. Thus real time updates of the depth model of an environment can be and are made and provided to one or more other devices, e.g., to facilitate rendering of an image in real or near real time while an event is still ongoing. In some embodiments the processor is further configured to: update the environmental depth map based on depth information generated from images captured by said stereoscopic pair of cameras during the event.

In some embodiments the processor is further configured to reconcile depth information generated from images captured by the light field camera with depth information generated from the stereoscopic images captured by the stereoscopic pair of cameras, as part of being configured to combine depth information from said at least two different sources of depth information.

In some embodiments the processor is further configured to use the depth information obtained from stereoscopic images to determine depths for environmental points which are located between environmental points for which depth information obtained from an image captured by the light field camera is available, as part of being configured to reconcile depth information generated from images captured by the light field camera and depth information obtained from stereoscopic images.

In some embodiments the environmental depth map is used to form a 3D model of the environment in which images are captured. In some embodiment the system further comprises a display device configured to display an image captured in the environment of interest wrapped onto the 3D model.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

While various embodiments have been discussed, it should be appreciated that not necessarily all embodiments include the same features and some of the described features are not necessary but can be desirable in some embodiments.

While various ranges and exemplary values are described the ranges and values are exemplary. In some embodiments the ranges of values are 20% larger than the ranges discussed above. In other embodiments the ranges are 20% smaller than the exemplary ranges discussed above. Similarly, particular values may be, and sometimes are, up to 20% larger than the values specified above while in other embodiments the values are up to 20% smaller than the values specified above. In still other embodiments other values are used.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data capture and processing systems. Various embodiments are also directed to methods, e.g., a method of image capture and/or processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or even some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed:

1. A method of operating an imaging system, comprising:
   acquiring depth measurements that were made using LIDAR;
   determining depths using at least one non-LIDAR depth measurement technique;
   determining a scaling factor from a LIDAR measured depth corresponding to a location and a non-LIDAR measured depth corresponding to said location,
   said non-LIDAR measured depth corresponding to said location differing from said LIDAR measured depth corresponding to said location due to a systematic non-LIDAR measurement error,
   said scaling factor being a factor which scales the non-LIDAR measured depth corresponding to said location by an amount required to match the LIDAR measured depth corresponding to said location;
   scaling one or more non-LIDAR measured depths by said determined scaling factor to compensate for systematic non-LIDAR measurement errors so that LIDAR and non-LIDAR depth measurements can be combined in a reliable manner,
   said scaling producing one or more scaled non-LIDAR depths;
   generating an environmental depth map of an environment of interest from LIDAR measured depths and said scaled non-LIDAR measured depths; and
   outputting said generated environmental depth map.

2. The method of claim 1, wherein said non-LIDAR measured depth is a depth generated from images of the environment of interest.

3. The method of claim 1, further comprising: updating the environmental depth map based on depth information obtained from the processing of images captured by said one or more cameras while an event is ongoing.

4. The method of claim 3, wherein generating the environmental depth map of the environment of interest includes
   performing a weighting operation giving greater weight to depth information from a first source of depth information than a second source of depth information;
   and wherein the method further comprises: updating the environmental depth map based on depth information generated from stereoscopic images captured by a pair of cameras used to capture a stereoscopic image pair while the event is ongoing.

5. The method of claim 4, wherein said stereoscopic image pair is processed to generate environmental depth information which provides more depth measurements of the environment for a point in time than is provided by the environmental depth information generated from images captured by one or more light field cameras.

6. The method of claim 1, wherein said LIDAR measured depth used to
   generate the scaling factor is a depth obtained from a static depth model based on LIDAR measurements that were made when the environment of interest was not occupied by spectators; and
   wherein depth information obtained from stereoscopic image pairs provides depth information which includes the effect of persons, props, stage sets, or signs present while the event is ongoing but not at the time of LIDAR measurements used to generate said static depth map.

7. The method of claim 1, wherein said step of generating the environmental depth map of the environment of interest is performed by a processor which accesses a static depth map which provides LIDAR measured depths corresponding to the environment of interest.

8. The method of claim 1, wherein generating the environmental depth map of the environment of interest includes: detecting a change in a depth measurement; determining a duration of the change in the depth measurement; and considering an amount of time for which the change in the depth measurement is detected as part of deciding whether to include the detected change in the depth measurement in said environmental depth map.

9. The method of claim 1, wherein said non-LIDAR depth measurement was obtained from stereoscopic images which provide depth information which is of higher resolution in terms of the number of spatial locations to which measurements correspond than depth information obtained from images captured by one or more light field cameras and which is also used to generate said environmental depth map of the environment of interest.

10. The method of claim 9, wherein said generating of the environmental depth map of the environment of interest includes: using depth information obtained from stereoscopic images to determine depths for environmental points which are located between environmental points for which light field camera provided depth information is available.

11. The method of claim 1, wherein the environmental depth map is in the form of a 3D model of the environment in which images are captured.

12. The method of claim 1, further comprising: displaying an image captured in the environment of interest to which said environmental depth map corresponds by wrapping the image onto the 3D model of the environment produced from depth measurements.

13. An imaging system, comprising:
a processor configured to:
acquire depth measurements that were made using LIDAR;
determine depths using at least one non-LIDAR depth measurement technique;
determine a scaling factor from a LIDAR measured depth corresponding to a location and a non-LIDAR measured depth corresponding to said location,
said non-LIDAR measured depth corresponding to said location differing from said LIDAR measured depth corresponding to said location due to a systematic non-LIDAR measurement error,
said scaling factor being a factor which scales the non-LIDAR measured depth corresponding to said location by an amount required to match the LIDAR measured depth corresponding to said location;
scale one or more non-LIDAR measured depths by said determined scaling factor to compensate for systematic non-LIDAR measurement errors so that LIDAR and non-LIDAR depth measurements can be combined in a reliable manner,
said scaling producing one or more scaled non-LIDAR depths;
generate an environmental depth map of an environment of interest from LIDAR measured depths and said scaled non-LIDAR measured depths; and
output said generated environmental depth map.

14. The imaging system of claim 13, further comprising: an interface configured to receive a static map of the environment; a light field camera for capturing images of the environment; and a stereoscopic pair of cameras for capturing pairs of images of the environment.

15. The imaging system of claim 14, wherein said processor is configured, as part of being configured to generate the environmental depth map, to: combine depth information from said at least two different sources of depth information, said depth information including at least two items from the list including
i) depth information obtained from said static map,
ii) depth information obtained from images captured by said light field camera,
iii) depth information obtained from images captured by said stereoscopic pair of cameras.

16. The method of claim 1, wherein said generating an environmental depth map includes: using depth information obtained from stereoscopic images to determine depths for environmental points which are located between environmental points for which light field camera provided depth information is available.

17. The method of claim 4, wherein said generating an environmental depth map includes: using depth information obtained from stereoscopic images to determine depths for environmental points which are located between environmental points for which light field camera provided depth information is available.

18. The method of claim 1, wherein said generating an environmental depth map includes: combining light field depth information with stereo depth information, said combining including treating the light field depth information as being more reliable than the stereo depth information with the light field depth information being weighted more heavily than stereoscopic determined depth information when both sources of information are available for the same location.

19. The imaging system of claim 13, wherein said non-LIDAR measured depth is a depth generated from images of the environment of interest.

20. The imaging system of claim 13, wherein said processor is further configured to: update the environmental depth map based on depth information obtained from the processing of images captured by one or more cameras while an event is ongoing.

21. The imaging system of claim 20, wherein said processor is configured, as part of being configured to generate the environmental depth map of the environment of interest, to perform a weighting operation giving greater weight to depth information from a first source of depth information than a second source of depth information; and wherein said processor is further configured to: update the environmental depth map based on depth information generated from stereoscopic images captured by a pair of cameras used to capture a stereoscopic image pair while the event is ongoing.

22. The imaging system of claim 21, wherein said stereoscopic image pair is processed to generate environmental depth information which provides more depth measurements of the environment for a point in time than is provided by environmental depth information generated from images captured by one or more light field cameras.

23. The imaging system of claim 13, wherein said LIDAR measured depth used to generate the scaling factor is a depth obtained from a static depth model based on LIDAR measurements that were made when the environment of interest was not occupied by spectators; and wherein depth information obtained from stereoscopic image pairs provides depth information which includes the effect of persons, props, stage sets, or signs present while the event is ongoing but not at the time of LIDAR measurements used to generate said static depth map.

* * * * *